United States Patent
Siegel et al.

(10) Patent No.: US 12,544,430 B2
(45) Date of Patent: *Feb. 10, 2026

(54) COMPOSITIONS AND METHODS FOR TREATING CELIAC SPRUE DISEASE

(71) Applicant: UNIVERSITY OF WASHINGTON THROUGH ITS CENTER FOR COMMERCIALIZATION, Seattle, WA (US)

(72) Inventors: Justin Siegel, Seattle, WA (US); David Baker, Seattle, WA (US); Sydney Rin Anna Gordon, Seattle, WA (US); Ingrid Swanson Pultz, Seattle, WA (US); Elizabeth Joy Stanley, Bothell, WA (US); Sarah Jane Wolf, Camas, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,879

(22) Filed: Nov. 20, 2023

(65) Prior Publication Data

US 2024/0207376 A1    Jun. 27, 2024

Related U.S. Application Data

(60) Continuation of application No. 17/114,294, filed on Dec. 7, 2020, now abandoned, which is a continuation of application No. 16/203,109, filed on Nov. 28, 2018, now Pat. No. 10,874,720, which is a continuation of application No. 15/896,536, filed on Feb. 14, 2018, now Pat. No. 10,149,892, which is a continuation of application No. 15/633,065, filed on Jun. 26, 2017, now Pat. No. 9,925,249, which is a continuation of application No. 15/006,341, filed on Jan. 26, 2016, now Pat. No. 9,707,280, which is a division of application No. 14/131,601, filed as application No. PCT/US2012/050364 on Aug. 10, 2012, now Pat. No. 9,289,473.

(60) Provisional application No. 61/521,899, filed on Aug. 10, 2011.

(51) Int. Cl.
    *C12N 9/52*    (2006.01)
    *A61K 38/48*   (2006.01)

(52) U.S. Cl.
    CPC ............ *A61K 38/482* (2013.01); *A61K 38/48* (2013.01); *C12N 9/52* (2013.01); *C12Y 304/21* (2013.01)

(58) Field of Classification Search
    CPC ..................................................... C12N 9/52
    See application file for complete search history.

(56) References Cited

U.S. PATENT DOCUMENTS

| | | |
|---|---|---|
| 5,554,508 A | 9/1996 | Auriol et al. |
| 7,202,216 B2 | 4/2007 | Sollid et al. |
| 7,265,093 B2 | 9/2007 | Khosla et al. |
| 7,303,871 B2 | 12/2007 | Hausch et al. |
| 7,320,788 B2 | 1/2008 | Shan et al. |
| 7,462,688 B2 | 12/2008 | Khosla et al. |
| 7,534,426 B2 | 5/2009 | Piper et al. |
| 7,563,864 B2 | 7/2009 | Marti et al. |
| 7,579,313 B2 | 8/2009 | Khosla et al. |
| 7,605,150 B2 | 10/2009 | Khosla et al. |
| 7,628,985 B2 | 12/2009 | Shan et al. |
| 7,776,545 B2 | 8/2010 | Khosla et al. |
| 7,910,541 B2 | 3/2011 | Hausch et al. |
| 7,923,532 B2 | 4/2011 | Hausch et al. |
| 7,928,056 B2 | 4/2011 | Hausch et al. |
| 7,943,312 B2 | 5/2011 | Hausch et al. |
| 8,071,316 B2 | 12/2011 | Khosla et al. |
| 8,143,210 B2 | 3/2012 | Shan et al. |
| 8,153,593 B2 | 4/2012 | Khosla et al. |
| 8,426,145 B2 | 4/2013 | Khosla et al. |
| 8,470,782 B2 | 6/2013 | Khosla et al. |
| 8,796,201 B2 | 8/2014 | Shan et al. |
| 8,871,718 B2 | 10/2014 | Khosla et al. |
| 8,962,545 B2 | 2/2015 | Hausch et al. |
| 9,707,280 B2 | 7/2017 | Siegel |
| 10,266,815 B2 | 4/2019 | Siegel |
| 10,487,318 B1 | 11/2019 | Siegel |
| 2006/0269538 A1 | 11/2006 | Kolterman et al. |
| 2009/0117092 A1 | 5/2009 | Kappler et al. |
| 2009/0280555 A1 | 11/2009 | Hausch et al. |
| 2011/0171201 A1 | 7/2011 | Siegel et al. |
| 2011/0293724 A1 | 12/2011 | Hausch et al. |

FOREIGN PATENT DOCUMENTS

| | | |
|---|---|---|
| JP | 2002078489 | 3/2002 |
| WO | 2013/023151 A2 | 2/2013 |
| WO | 2013/083338 A1 | 6/2013 |
| WO | 2015/023728 A1 | 2/2015 |

(Continued)

OTHER PUBLICATIONS

Mavromatis et al., "Complete genome sequence of Alicyclobacillus acidocaldarius type strain (104-IA)", Standards in Genomic Science, Jan. 2010, vol. 2, No. 1, pp. 9-18. doi: 10.4056/sigs.591104.*
Office Action dated Dec. 23, 2015 in EP 12748354.3.
Ehren, Jennifer, Sridhar Govindarajan, Belâen Morâon, Jeremy Minshull, and Chaitan Khosla. 2008. "Protein engineering of improved prolyl endopeptidases for celiac sprue therapy". Protein Engineering, Design & Selection. 21 (12): 699-707.
Shan L, Ø Molberg, I Parrot, F Hausch, F Filiz, GM Gray, LM Sollid, and C Khosla. 2002. "Structural basis for gluten intolerance in celiac sprue". Science (New York, N.Y.). 297 (5590): 2275-9.

(Continued)

*Primary Examiner* — Suzanne M Noakes
(74) *Attorney, Agent, or Firm* — MCDONNELL BOEHNEN HULBERT & BERGHOFF LLP

(57) ABSTRACT

The invention provides compositions and methods for treating celiac sprue.

13 Claims, 4 Drawing Sheets

Specification includes a Sequence Listing.

(56) References Cited

FOREIGN PATENT DOCUMENTS

WO 2016/200880 12/2016

OTHER PUBLICATIONS

Wlodawer A, M Li, A Gustchina, N Tsuruoka, M Ashida, H Minakata, H Oyama, K Oda, T Nishino, and T Nakayama. 2004. "Crystallographic and biochemical investigations of kumamolisin-As, a serine-carboxyl peptidase with collagenase activity". The Journal of Biological Chemistry. 279 (20): 21500-10.
Vora Harmit, et al., (2007) "A scaleable manufacturing process for pro-EP-B2, a cysteine protease from barley indicated for celiac psrue," Biotechnology and Bioengineering, 98(1): 177-185.
Oyama Hiroshi, et al., (2002) "A CLN2-related and thermostable serine-carboxyl proteinase, kumamolysin: cloning, expression, and identification of catalytic serine residue," Biochemistry, 131(5):757-765.
International Search Report for PCT/US12/50364, mailed Apr. 18, 2013.
Vora, et al., "A Scaleable Manufacturing Process for pro-EP-B2, A Cysteine Protease From Barley Indicated for Celiac Sprue," Biotechnology and Bioengineering, vol. 98, No. 1, Sep. 1, 2007.
Wieser, "Chemistry of gluten proteins," Food Microbiology 24 (2007) 115-119.
Wlodawer, et al., "Crystallographic andBiochemical Investigations of Kumamolisin-As, a Serine-Carboxyl Peptidase with Collagenase Activity," The Journal of Biological Chemistry vol. 279, No. 20, Issue of May 14, pp. 21500-21510, 2004.
Arentz-Hansen et al. (Sep. 2002) "Celiac lesion T cells recognize epitopes that cluster in regions of gliadins rich in proline residues," Gastroenterology, 123(3):803-809.
Siegel et al. (Jul. 2010) "Computational Design of an Enzyme Catalyst for a Stereoselective Bimolecular Diels-Alder Reaction," Science, 329(5989):309-313.
UniProt C8WU40—Retrieved from < http://www.uniprot.org/uniprot/C8WU40 >on Jan. 29, 2015.
Mustalahti K, C Catassi, A Reunanen, E Fabiani, M Heier, S McMillan, L Murray, et al. 2010. "The prevalence of celiac disease in Europe: results of a centralized, international mass screening project". Annals of Medicine. 42 (8): 587-95.
Cornellas-Bigler, et al., "1.2 A crystal structure of the serine carboxyl porteinase pro-kumamolisin: structure of an intact pro-subtilase," Structure, 12: 1313-1323, Jul. 2004.
Dunn, et al., "Engineered Enzyme," Encyclopedia of Life Sciences, 2005, p. 1-8.
Genbank: ACV57803.1, Peptidase S53 propeptide, Sep. 2009.
GenBank: BAC41257.1, kumamolisin-As precursor, Jun. 2003.
GenBank: 1SIO_A, Chain A, Structure of Kumamolisin-As Complex, Sep. 2008.
International Search Report and Written Opinion for PCT/US2016/036356, mailed Aug. 10, 2016.
Database Uniparc, XP002760283, Jan. 15, 2010.
Wolf, et al., "Engineering of Kuma 030: A Gliadin peptidase that rapidly degrades immunogenic gliadin peptides in gastric conditions," Journal of the American Chemical Society, 137(40): 13106-13113, Oct. 2015.
K590023, Kumamolisin-As_N291 D, (Sep. 15, 2011), http://parts.igem.org/wiki/index.php?title=Part:BBa_K590023.
K590024, Kumamolisin-As_S354N, D358G, D368H, (2011-09-15), http://parts.igem.org/wiki/index.php?title=Part: BBa_K590024.
K590087, KumaMax: Kumamolisin-As_N291D, G319S, D358G, D368H, (Sep. 22, 2011), http://parts.igem.org/wiki/index.php?title=Part:BBa_K590087.
Tsuruoka et al., "Collagenolytic Serine-Carboxyl Proteinase from Alicyclobacillus sendaiensis Strain NTAP-1: Purification, Characterization, Gene Cloning, and Heterologous Expression," Applied and Environmental Microbiology, 69(1):162-169 (2003).
UW iGEM, Make It or Break It, Make It or Break It: Diesel Production and Gluten Destruction, the Synthetic Biology Way, Team:Washington—2011.igem.org, https://2011.igem.org/Team:Washington.
UW iGEM, Make It or Break It, Gluten Destruction: Background, Team:Washington/Celiacs/Background—2011.gem .org, https://2011.igem .org/Team:Washington/Celiacs/Background.
UW iGEM, Make It or Break It, Gluten Destruction: Parts Submitted, Team:Washington/Celiacs/Parts—2011.gem .org, https://2011.igem .org/Team:Washington/Celiacs/Parts.
UW iGEM, Make It or Break It, Gluten Destruction: Methods, Team:Washington/Celiacs/Methods—2011.igem.prg, https://2011.igem.org/Team:Washington/Celiacs/Methods.
UW iGEM, Make It or Break It, Gluten Destruction: Results Summary, Team:Washington/Celiacs/Results—2011.gem .org, https://2011.igem .org/Team:Washington/Celiacs/Results.
UW iGEM, Make It or Break It, Gluten Destruction: Future Directions, Team:Washington/Celiacs/Future—2011.gem.org, https://2011.igem.org/Team:Washington/Celiacs/Future.
UW iGEM, Make It or Break It, Small Scale (50mL) Protein Expression and Purification, Team:Washington/Protocols/50mL_Scale—2011.igem.org, https://2011.igem.org/Team:Washington/Protocols/50mL_Scale.
UW iGEM, Make It or Break It, Enzyme Assay, Team:Washington/Protocols/Purified Enzyme Assay—2011.igem org, https://2011.igem.org/Team:Washington/Protocols/Purified_Enzyme_Assay.
Byun et al. "Synergistic Action of an X-Prolyl Dipeptidyl Aminopeptidase and a Non-Specific Aminopeptidase in Protein Hydrolysis" J Agric. Food Chem. 49:2061-63 (2001 ).
Genbank accession No. ACU54006.1 "Peptidase S53 propeptide [Acidimicrobium ferrooxidans DSM 10331 ]" (Genbank accession No. ACU54006_ 1, publically available since Aug. 18, 2009, retrieved from the internet: <https://www. ncbi .nlm .nih.gov/protein/A CU54006?report=genbank&log$=proalign& align&blast-rank=1&RID=E6Z6PR8P015, retrieved on Apr. 27, 2018).
UniProt K8RML0_9BURK, Feb. 6, 2013. ("Kumar"), one page.
GenPept: PDB 4NE7 A Chain A, Kumamolisin-as; pp. 1-4, Nov. 2013.
Akobeng, et al., "Systematic review: tolerable amount of gluten for people with coeliac disease," Alimentary Pharmacology & Therapeutics, 27: 1044-1052 (2008).
Arentz-Hansen, et al., "The Intestinal T Cell Response to a-Gliadin in Adult Celiac Disease Is Focused on a Single Deamidated Glutamine Targeted by Tissue Transglutaminase," J. Exp. Med., 191(4): 603-612, 2000.
Armstrong, et al., "Advances in coeliac disease," Curr Opin Gastroenterol 2012, 28:104-112.
Arnold, "Combinatorial and computational challenges for biocatalyst design," Nature, 409: 253-257, Jan. 2001.
Bershtein, et al., "Advances in laboratory evolution of enzymes," Current Opinion in Chemical Biology 2008, 12:151-158.
Bethune, et al., "Heterologous Expression, Purification, Refolding, and Structural-Functional Characterization of EP-B2, a Self-Activating Barley Cysteine Endoprotease," Chemistry & Biology 13, 637-647, Jun. 2006.
Bethune, et al., "Oral Enzyme Therapy for Celiac Sprue," Methods in Enzymology, 502: 241-270, 2012.
Camacrca, et al., "Intestinal T Cell Responses to Gluten Peptides Are Largely Heterogeneous: Implications for a Peptide-Based Therapy in Celiac Disease," The Journal of Immunology, 2009, 4158-4166.
Castillo, et al., "The present and the future in the diagnosis and management of celiac disease," Gastroenterology Report, 3(1), 2015, 3-11.
Catassi, et al., "World Perspective and Celiac Disease Epidemiology," Dig Dis 2015;33:141-146.
Catassi, et al., "A prospective, double-blind, placebo-controlled trial to establish a safe gluten threshold for patients with celiac disease," Am J Clin Nutr 2007;85:160-6.
Chand, et al., "Celiac Disease Current Concepts in Diagnosis and Treatment," J Clin Gastroenterol 2006;40:3-14.
Chang, et al., "A Novel Placement Method of the Bravo Wireless pH Monitoring Capsule for Measuring Intragastric pH," Dig Dis Sci (2009) 54:578-585.

(56) References Cited

OTHER PUBLICATIONS

Ehern, et al., "A Food-Grade Enzyme Preparation with Modest Gluten Detoxification Properties," PLoS One 4(7): e6313. doi:10.1371/journal.pone.0006313, Jul. 2009.
Ehern, et al., "Protein engineering of improved prolyl endopeptidases for celiac sprue therapy," Protein Engineering, Design & Selection vol. 21 No. 12 pp. 699-707, 2008.
Eiben, et al., "Increased Diels-Alderase activity through backbone remodeling guided by Foldit players," Nature Biotechnology, 30(2): 190-194, 2012.
Fleishman, et al., "Computational Design of Proteins Targeting the Conserved Stem Region of Influenza Hemagglutinin," Science, 332:816-821, May 2011.
Gardner, et al., Measurement of meal-stimulated gastric acid secretion by in vivo gastric autotitration, J Appl Physiol 92: 427-434, 2002.
Gass, et al., "Combination Enzyme Therapy for Gastric Digestion of Dietary Gluten in Patients With Celiac Sprue," Gastroenterology 2007; 133:472-480.
Gass, et al., "Effect of Barley Endoprotease EP-B2 on Gluten Digestion in the Intact Rat," The Journal of Pharmacology and Experimental Therapeutics vol. 318, No. 3, pp. 1178-1186, 2006.
Gordon, et al., "Computational Design of an a Gliadin Peptidase," J. Am. Chem. Soc. 2012, 134, 20513-20520.
Hausch, et al., "Intestinal digestive resistance of immunodominant gliadin peptides," Am J Physiol Gastrointest Liver Physiol 283: G996-G1003, 2002.
Houghton, et al., "Relationship of the Motor Activity of the Antrum, Pylorus, and Duodenum to Gastric Emptying of a Solid Liquid Mixed Meal," Gatroenterology, 1988; 94:1285-91.
International Search Report PCT/US2012/050364, mailed Apr. 18, 2013.
International Search Report PCT/US2014/050835, mailed Dec. 2, 2014.
Kuhlman, et al., "Design of a Novel Globular Protein Fold with Atomic-Level Accuracy," Science, 302: 1364-1368, Nov. 2003.
Kunkel, "Rapid and efficient site-specific mutagenesis without phenotypic selection," Proc. Natl. Acad. Sci. USA vol. 82, pp. 488-492, Jan. 1985.
Lahdeaho, et al., "Glutenase ALV003 Attenuates Gluten-Induced Mucosal Injury in Patients With Celiac Disease," Gastroenterology 2014; 146:1649-1658.
Leaver-Fay, et al., "ROSETTA3: An Object-Oriented Software Suite for the Simulation and Design of Macromolecules," Methods in Enzymology, vol. 487:545-574, 2011.
Lupo, et al., "Validation Study of the Veratox R5 Rapid ELISA for Detection of Gliadin," Journal of AOA C International vol. 96, No. 1, 2013.
Moron, et al., "Sensitive detection of cereal fractions that are toxic to celiac disease patients by using monoclonal antibodies to a main immunogenic wheat peptide," Am J Clin Nutr 2008;87:405-14.

Mustalahti, et al., "The prevalence of celiac disease in Europe: Results of a centralized, international mass screening project," Annals of Medicine, 42:8, 587-595, Nov. 2010.
Oda, et al., "Subsite Preferences of Pepstatin-Insensitive Carboxyl Proteinases from Prokaryotes: Kumamolysin, a Thermostable Pepstatin-Insensitive Carboxyl Proteinase," J. Biochem. 128,499-607 (2000).
Okubo, et al., "Processing, catalytic activity and crystal structures of kumamolisin-As with an engineered active site," FEBS Journal 273 (2006) 2563-2576.
Oyama, et al., "A CLN2-Related and Thermostable Serine-Carboxyl Proteinase, Kumamolysin: Cloning, Expression, and Identification of Catalytic Serine Residue," J. Biochem. 131, 757-766 (2002).
Pera, et al., "Influence of Mastication on Gastric Emptying," J Dent Res 81(3):179-181, 2002.
Petersen, et al., "T-cell receptor recognition of HLA-DQ2-gliadin complexes associated with celiac disease," Nature Structural & Molecular Biology, 21(5): 480-490, May 2014.
Picariello, et al., "Proteomics, Peptidomics, and Immunogenic Potential of Wheat Beer (Weissbier)," J. Agric. Food Chem. 2015, 63, 3579-3586.
Richter, et al., "De Novo Enzyme Design Using Rosetta3," PLoS One 6(5): e19230. doi:10.1371/journal.pone.0019230, May 2011.
Romero, et al., "Exploring protein fitness landscapes by directed evolution," Nature Reviews: Molecular cell Biology, 10: 866-876, Dec. 2009.
Rubio-Tapia, et al., "The Prevalence of Celiac Disease in the United States," Am J Gastroenterol 2012; 107:1538-1544; doi: 10.1038/ajg.2012.219; published online Jul. 31, 2012.
Shan, et al., "Comparative biochemical analysis of three bacterial prolyl endopeptidases: implications for coeliac sprue," Biochem. J. (2004) 383, 311-318.
Shan, et al., "Identification and Analysis of Multivalent Proteolytically Resistant Peptides from Gluten: Implications for Celiac Sprue," Journal of Proteome Research 2005, 4, 1732-1741.
Shan, et al., "Structural Basis for Gluten Intolerance in Celiac Sprue," Science, 297:2275-2279, Sep. 2002.
Siegel, et al., "Rational Design of Combination Enzyme Therapy for Celiac Sprue," Chemistry & Biology 13, 649-658, Jun. 2006.
Siegel, et al., "Safety, Tolerability, and Activity of ALV003: Results from Two Phase 1 Single, Escalating-Dose Clinical Trials," Dig Dis Sci (2012) 57:440-450.
Sollid, et al., "Nomenclature and listing of celiac disease relevant gluten T-cell epitopes restricted by HLA-DQ molecules," Immunogenetics (2012) 64:455-460.
Sollid, et al., "Coeliac Disease: Dissecting a Complex Inflammatory Disorder," Nature Reviews: Immunology, 2:847-855, Sep. 2002.
Stepniak, et al., "Highly efficient gluten degradation with a newly identified prolyl endoprotease: implications for celiac disease," Am J Physiol Gastrointest Liver Physiol 291: G621-G629, May 2006.
Tye-Din, et al., "Comprehensive, Quantitative Mapping of T Cell Epitopes in Gluten in Celiac Disease," Sci Transl Med 2, 41ra51 (2010).

\* cited by examiner

COMPOSITIONS AND METHODS FOR TREATING CELIAC SPRUE DISEASE

CROSS REFERENCE

This application is a Continuation of U.S. patent application Ser. No. 17/114,294, filed Dec. 7, 2020, which is a Continuation of U.S. patent application Ser. No. 16/203,109, filed Nov. 27, 2018 now U.S. patent Ser. No. 10/874,720 issued Dec. 29, 2020, which is a Continuation of U.S. patent application Ser. No. 15/896,536, filed Feb. 13, 2018 now U.S. patent Ser. No. 10/149,892 issued Dec. 10, 2018, which is a Continuation of U.S. patent application Ser. No. 15/633,065, filed Jun. 25, 2017 now U.S. Pat. No. 9,925,249 issued Mar. 26, 2018, which is a Continuation of U.S. patent application Ser. No. 15/006,341, filed Jan. 25, 2016 now U.S. Pat. No. 9,707,280 issued Jul. 17, 2017, which is a Divisional of U.S. patent application Ser. No. 14/131,601, filed Feb. 25, 2014 now U.S. Pat. No. 9,289,473 issued Mar. 21, 2016, which an International Application No. PCT/US2012/050364, filed Aug. 9, 2012, which claims priority to U.S. Provisional Application No. 61/521,899, filed Aug. 9, 2011, the disclosures of which are hereby incorporated by reference in their entirety.

STATEMENT OF GOVERNMENT SUPPORT

This invention was made with government support under Defense Advanced Research Projects Agency (DARPA) grant number HR0011-08-1-0085. The government has certain rights in the invention.

SEQUENCE LISTING STATEMENT

A computer readable form of the Sequence Listing is filed with this application by electronic submission and is incorporated into this application by reference in its entirety. The Sequence Listing is contained in the file created on Nov. 15, 2023, having the file name "12-709-WO-US-DIV5.xml" and is 151,972 bytes in size.

BACKGROUND

Celiac sprue is a highly prevalent disease in which dietary proteins found in wheat, barley, and rye products known as 'glutens' evoke an immune response in the small intestine of genetically predisposed individuals. The resulting inflammation can lead to the degradation of the villi of the small intestine, impeding the absorption of nutrients. Symptoms can appear in early childhood or later in life, and range widely in severity, from diarrhea, fatigue and weight loss to abdominal distension, anemia, and neurological symptoms. There are currently no effective therapies for this lifelong disease except the total elimination of glutens from the diet. Although celiac sprue remains largely underdiagnosed, its' prevalence in the US and Europe is estimated at 0.5-1.0% of the population. The identification of suitable naturally-occurring enzymes as oral therapeutics for Celiac disease is difficult due to the stringent physical and chemical requirements to specifically and efficiently degrade gluten-derived peptides in the harsh and highly acidic environment of the human digestive tract.

SUMMARY OF THE INVENTION

In a first aspect, the present invention provides polypeptides comprising an amino acid sequence at least 75% identical to an amino acid sequence according to SEQ ID NO:35, wherein (a) the polypeptide degrades a PQPQLP (SEQ ID NO:34) peptide at pH 4;
(b) residue 278 is Ser, residue 78 is Glu, and residue 82 is Asp; and
(c) the polypeptide comprises an amino acid change from SEQ ID NO: 67 at one or more residues selected from the group consisting of 73, 102, 103, 104, 130, 165, 168, 169, 172, and 179.

In a second aspect, the present invention provides polypeptide comprising an amino acid sequence at least 75% identical to an amino acid sequence according to SEQ ID NO:1, wherein
(a) the polypeptide degrades a PQPQLP (SEQ ID NO:34) peptide at pH 4;
(b) residue 467 is Ser, residue 267 is Glu, and residue 271 is Asp; and
(c) the polypeptide comprises an amino acid change from SEQ ID NO: 33 at one or more residues selected from the group consisting of 119, 262, 291, 292, 293, 319, 354, 357, 358, 361, and 368.

In various embodiments of the first and second aspect, the polypeptide comprises an amino acid sequence at least 85%, 95%, or 100% identical to an amino acid sequence according to SEQ ID NO:1 or SEQ ID NO: 35. In another embodiment, the polypeptide, comprises an amino acid sequence according to any one of SEQ ID NO:2-66.

In another aspect, the present invention provides polypeptides comprising an amino acid sequence according to SEQ ID NO:1, wherein the polypeptide comprises at least one amino acid change from SEQ ID NO: 33. In another aspect, the present invention provides a polypeptide comprising an amino acid sequence according to SEQ ID NO:35, wherein the polypeptide comprises at least one amino acid change from SEQ ID NO: 67. In various embodiments, the polypeptide, comprises an amino acid sequence according to any one of SEQ ID NO:2-66.

In a further aspect, the present invention provides nucleic acids encoding the polypeptide of any aspect or embodiment of the invention. In another aspect, the invention provides nucleic acid expression vectors comprising the isolated nucleic acids of the invention. In a further embodiment, the invention provides recombinant host cells comprising the nucleic acid expression vectors of the invention. In another aspect, the invention provides pharmaceutical compositions, comprising the polypeptides, the nucleic acids, the nucleic acid expression vectors and/or the recombinant host cells of the invention, and a pharmaceutically acceptable carrier.

In another aspect, the invention provides methods for treating celiac sprue, comprising administering to an individual with celiac sprue a polypeptide or pharmaceutical composition according to any embodiment of the invention, or a polypeptide comprising an amino acid selected from the group consisting of SEQ ID NO:33 or SEQ ID NO:67.

DETAILED DESCRIPTION

Figure 1:
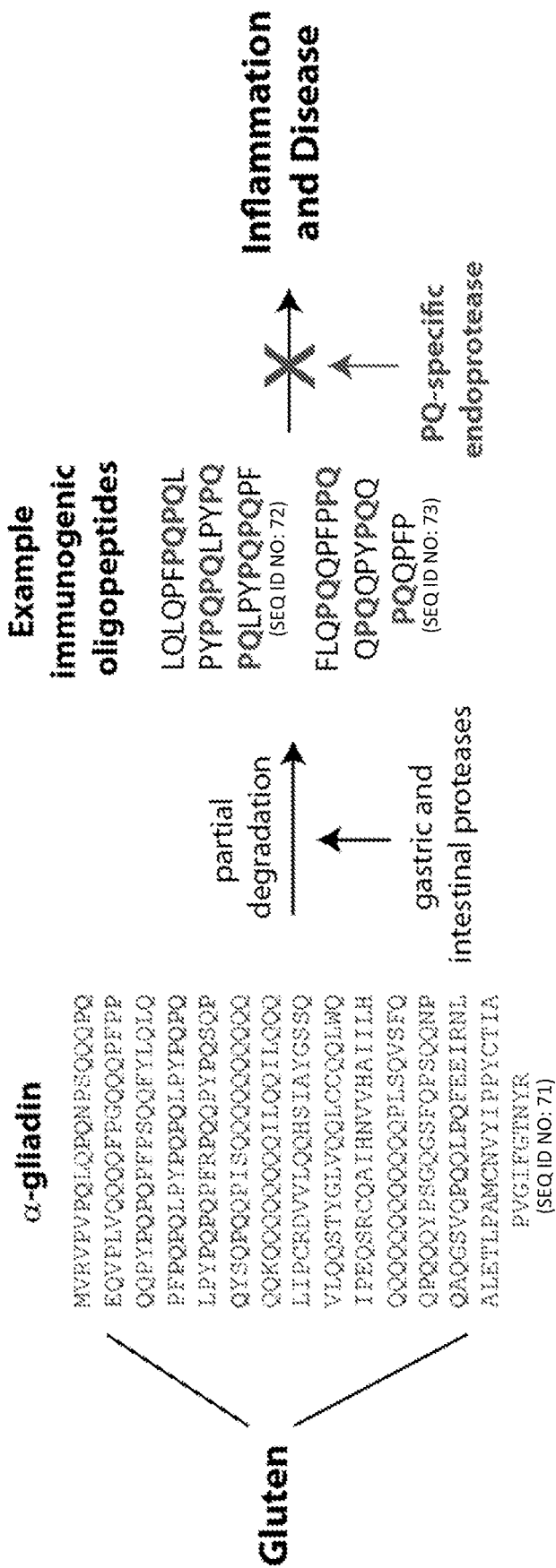
FIG. 1. Schematic depicting the role of enzyme therapeutics in the treatment of Celiac disease. Gluten is comprised of many glycoproteins including α-gliadin. Partial proteolysis of α-gliadin (SEQ ID NO: 71) results in protease-resistant peptides enriched in a PQ dipeptide motif that can lead to inflammation and disease. The addition of an oral enzyme therapeutic that is functional in the stomach and capable of specifically degrading the immunogenic peptides could potentially act as a therapeutic for this disease.

All references cited are herein incorporated by reference in their entirety. Within this application, unless otherwise stated, the techniques utilized may be found in any of several well-known references such as: *Molecular Cloning: A Laboratory Manual* (Sambrook, et al., 1989, Cold Spring Harbor Laboratory Press), *Gene Expression Technology* (Methods in Enzymology, Vol. 185, edited by D. Goeddel, 1991. Academic Press, San Diego, CA), "Guide to Protein Purification" in *Methods in Enzymology* (M. P. Deutshcer, ed., (1990) Academic Press, Inc.); *PCR Protocols: A Guide to Methods and Applications* (Innis, et al. 1990. Academic Press, San Diego, CA), *Culture of Animal Cells: A Manual of Basic Technique*, 2$^{nd}$ Ed. (R. I. Freshney. 1987. Liss, Inc. New York, NY), *Gene Transfer and Expression Protocols*, pp. 109-128, ed. E. J. Murray, The Humana Press Inc., Clifton, N.J.), and the Ambion 1998 Catalog (Ambion, Austin, TX).

As used herein, the singular forms "a", "an" and "the" include plural referents unless the context clearly dictates otherwise. "And" as used herein is interchangeably used with "or" unless expressly stated otherwise.

As used herein, amino acid residues are abbreviated as follows: alanine (Ala; A), asparagine (Asn; N), aspartic acid (Asp; D), arginine (Arg; R), cysteine (Cys; C), glutamic acid (Glu; E), glutamine (Gln; Q), glycine (Gly; G), histidine (His; H), isoleucine (Ile; I), leucine (Leu; L), lysine (Lys; K), methionine (Met; M), phenylalanine (Phe; F), proline (Pro; P), serine (Ser; S), threonine (Thr; T), tryptophan (Trp; W), tyrosine (Tyr; Y), and valine (Val; V).

All embodiments of any aspect of the invention can be used in combination, unless the context clearly dictates otherwise.

In a first aspect, the present invention provides polypeptides comprising an amino acid sequence at least 75% identical to an amino acid sequence according to SEQ ID NO:35, wherein
(a) the polypeptide degrades a PQPQLP (SEQ ID NO:34) peptide at pH 4;
(b) residue 278 is Ser, residue 78 is Glu, and residue 82 is Asp; and
(c) the polypeptide comprises an amino acid change from SEQ ID NO: 67 at one or more residues selected from the group consisting of 73, 102, 103, 104, 130, 165, 168, 169, 172, and 179.

As disclosed in the examples that follow, polypeptides according to this aspect of the invention can be used, for example, in treating celiac sprue. The polypeptides are modified versions of either the processed version of Kumamolisin-As (SEQ ID NO:67) or the preprocessed version of Kumamolisin-As (SEQ ID NO:33), which is known as a member of the sedolisin family of serine-carboxyl peptidases, and utilizes the key catalytic triad Ser$^{278}$-Glu$^{78}$-Asp$^{82}$ in its processed form to hydrolyze its substrate (Ser$^{467}$-Glu$^{267}$-Asp$^{271}$ in the pre-processed form) Its maximal activity is at pH ~4.0. While the native substrate for Kumamolisin-As is unknown, it has been previously shown to degrade collagen under acidic conditions (4). In addition, this enzyme has been shown to be thermostable, with an ideal temperature at 60° C., but still showing significant activity at 37° C.

The inventors of the present invention have unexpectedly discovered that Kumamolisin-As is capable of degrading proline (P)- and glutamine (Q)-rich components of gluten known as 'gliadins' believed responsible for the bulk of the immune response in most celiac sprue patients.

The polypeptides of the invention show improved protease activity at pH 4 against the oligopeptide PQPQLP (a substrate representative of gliadin) compared to wild type Kumamolisin-As.

The polypeptides of this aspect of the invention degrade a PQPQLP (SEQ ID NO:34) peptide at pH 4. Such degradation occurs under the conditions disclosed in the examples that follow.

The polypeptides of this aspect comprise one or more amino acid changes from SEQ ID NO: 67 (wild type processed Kumamolisin-As) at one or more residues selected from the group consisting of residues 73, 102, 103, 104, 130, 165, 168, 169, 172, and 179 (numbering based on the wild type processed Kumamolisin-As amino acid sequence). In non-limiting embodiments, the one or more changes relative to the wild type processed Kumamolisin-As amino acid sequence (SEQ ID NO:67) are selected from the group consisting of:

| WT Residue# | AA change |
|---|---|
| S73 | K, G |
| N102 | D |
| T103 | S |
| D104 | A, T, N |
| G130 | S |
| S165 | N |
| T168 | A |
| D169 | N, G |
| Q172 | D |
| D179 | S, H |

In various further non-limiting embodiments, the one or more changes relative to the wild type processed Kumamolisin-As amino acid sequence include at least N102D. In another embodiment the one or more changes relative to the wild type Kumamolisin-As amino acid sequence include at least N102D and D169N or D169G. In another embodiment the one or more changes relative to the wild type Kumamolisin-As amino acid sequence include at least N102D, D169G, and D179H. In another embodiment the one or more changes relative to the wild type Kumamolisin-As amino acid sequence include at least S73K, D104T, N102D, G130S, D169G, and D179H.

As used herein, "at least 75% identical" means that the polypeptide differs in its full length amino acid sequence by less 25% or less (including any amino acid substitutions, deletions, additions, or insertions) from the polypeptide defined by SEQ ID NO:35.

In various preferred embodiment, the polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to SEQ ID NO:35. In a further embodiment the polypeptides comprise or consist of an amino acid sequence according to SEQ ID NO:35.

In various further embodiments, the polypeptides comprise or consist of an amino acid sequence at least 75% identical to any one of SEQ ID NOS:36-66. The polypeptides represented by these SEQ ID NOS are specific examples of polypeptides with improved protease activity at pH 4 against the oligopeptide PQPQLP (SEQ ID NO: 34) (a substrate representative of gliadin) compared to wild type Kumamolisin-As. In various preferred embodiment, the polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to any one of SEQ ID NOS:36-66. In a further embodiment the polypeptides comprise or consist of an amino acid sequence according to any one of SEQ ID NOS:36-66.

In a preferred embodiment of this first aspect, the polypeptides comprising an amino acid sequence at least 75% identical to an amino acid sequence according to SEQ ID NO:1 (based on variants of the preprocessed version of Kumamolisin-As), wherein
(a) the polypeptide degrades a PQPQLP (SEQ ID NO:34) peptide at pH 4;
(b) residue 467 is Ser, residue 267 is Glu, and residue 271 is Asp; and
(c) the polypeptide comprises an amino acid change from SEQ ID NO: 33 at one or more residues selected from the group consisting of 119, 262, 291, 292, 293, 319, 354, 357, 358, 361, and 368.

The polypeptides of this embodiment comprise one or more amino acid changes from SEQ ID NO: 33 (wild type pre-processed Kumamolisin-As) at one or more residues selected from the group consisting of residues 119, 262, 291, 292, 293, 319, 354, 357, 358, 361, and 368 (numbering based on the wild type pre-processed Kumamolisin-As amino acid sequence). In non-limiting embodiments, the one or more changes relative to the wild type Kumamolisin-As amino acid sequence are selected from the group consisting of:

| WT Residue# | AA change |
| --- | --- |
| V119 | D |
| S262 | K, G |
| N291 | D |
| T292 | S |
| D293 | A, T, N |
| G319 | S |
| S354 | N |
| T357 | A |
| D358 | N, G |

| WT Residue# | AA change |
| --- | --- |
| Q361 | D |
| D368 | S, H |

In various further non-limiting embodiments, the one or more changes relative to the wild type Kumamolisin-As amino acid sequence include at least N291D. In another embodiment the one or more changes relative to the wild type Kumamolisin-As amino acid sequence include at least N291D and 358N or 358G. In another embodiment the one or more changes relative to the wild type Kumamolisin-As amino acid sequence include at least N291D, 358G, and 368H. In another embodiment the one or more changes relative to the wild type Kumamolisin-As amino acid sequence include at least V119D, S262K, D293T, N291D, G319S, D358G, and D368H.

As used herein, "at least 75% identical" means that the polypeptide differs in its full length amino acid sequence by less 25% or less (including any amino acid substitutions, deletions, additions, or insertions) from the polypeptide defined by SEQ ID NO:1.

In various preferred embodiment, the polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to SEQ ID NO:1. In a further embodiment the polypeptides comprise or consist of an amino acid sequence according to SEQ ID NO:1.

In various further embodiments, the polypeptides comprise or consist of an amino acid sequence at least 75% identical to any one of SEQ ID NOS:2-32. The polypeptides represented by these SEQ ID NOS are specific examples of polypeptides with improved protease activity at pH 4 against the oligopeptide PQPQLP (SEQ ID NO: 34) (a substrate representative of gliadin) compared to wild type Kumamolisin-As. In various preferred embodiment, the polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to any one of SEQ ID NOS:2-32. In a further embodiment the polypeptides comprise or consist of an amino acid sequence according to any one of SEQ ID NOS:2-32.

In a second aspect, the present invention provides polypeptides comprising or consisting of an amino acid sequence according to SEQ ID NO:35, wherein the polypeptide comprises at least one amino acid change from SEQ ID NO: 67. As disclosed in the examples that follow, polypeptides according to this aspect of the invention can be used, for example, in treating celiac sprue. The polypeptides are modified versions of processed Kumamolisin-As (SEQ ID NO:67), that show improved protease activity at pH 4 against the oligopeptide PQPQLP (SEQ ID NO: 34) (a substrate representative of gliadin) compared to wild type Kumamolisin-As. In one embodiment, the polypeptides comprise or consist of an amino acid sequence according to SEQ ID NO:36. Polypeptides according to SEQ ID NO:36 have a N102D mutation relative to wild-type processed Kumamolisin-As. As shown in the examples that follow, polypeptides containing this mutation have at least 10-fold improved protease activity at pH 4 against the oligopeptide PQPQLP (SEQ ID NO: 34) compared to wild type Kumamolisin-As.

In another embodiment of this second aspect, the polypeptides comprise or consist of an amino acid sequence according to SEQ ID NO:37. Polypeptides according to SEQ ID NO:37 have a N102D mutation and a D169N or D169G mutation relative to wild-type processed Kumamolisin-As. As shown in the examples that follow, polypeptides containing this mutation have at least 20-fold improved protease activity at pH 4 against the oligopeptide PQPQLP (SEQ ID NO: 34) compared to wild type Kumamolisin-As.

In another embodiment of this second aspect, the polypeptides comprise or consist of an amino acid sequence according to SEQ ID NO:38. Polypeptides according to SEQ ID NO:38 have a N102D mutation, a D169G, and a D179H mutation relative to wild-type processed Kumamolisin-As. As shown in the examples that follow, polypeptides containing this mutation have at least 50-fold improved protease activity at pH 4 against the oligopeptide PQPQLP (SEQ ID NO: 34) compared to wild type Kumamolisin-As.

In a further embodiment of this second aspect, the polypeptides comprise or consist of an amino acid sequence according to any one of SEQ ID NOS:39-66. Polypeptides according to these embodiments have all been demonstrated to show improved protease activity at pH 4 against the oligopeptide PQPQLP (SEQ ID NO: 34) compared to wild type Kumamolisin-As. In a preferred embodiment, the polypeptide comprises or consists of an amino acid sequence according to SEQ ID NO:66.

In a preferred embodiment of this second aspect, the present invention provides polypeptides comprising or consisting of an amino acid sequence according to SEQ ID NO:1, wherein the polypeptide comprises at least one amino acid change from SEQ ID NO: 33. As disclosed in the examples that follow, polypeptides according to this aspect of the invention can be used, for example, in treating celiac sprue. The polypeptides are modified versions of preprocessed Kumamolisin-As (SEQ ID NO:33), that show improved protease activity at pH 4 against the oligopeptide PQPQLP (SEQ ID NO: 34) (a substrate representative of gliadin) compared to wild type Kumamolisin-As. In one embodiment, the polypeptides comprise or consist of an amino acid sequence according to SEQ ID NO:2. Polypeptides according to SEQ ID NO:2 have a N291D mutation relative to preprocessed wild-type Kumamolisin-As. As shown in the examples that follow, polypeptides containing this mutation have at least 10-fold improved protease activity at pH 4 against the oligopeptide PQPQLP (SEQ ID NO: 34) compared to wild type Kumamolisin-As.

In another embodiment of this second aspect, the polypeptides comprise or consist of an amino acid sequence according to SEQ ID NO:3. Polypeptides according to SEQ ID NO:3 have a N291D mutation and a D358N or D358G mutation relative to preprocessed wild-type Kumamolisin-As. As shown in the examples that follow, polypeptides containing this mutation have at least 20-fold improved protease activity at pH 4 against the oligopeptide PQPQLP (SEQ ID NO: 34) compared to wild type Kumamolisin-As.

In another embodiment of this second aspect, the polypeptides comprise or consist of an amino acid sequence according to SEQ ID NO:4. Polypeptides according to SEQ ID NO:4 have a N291D mutation, a D358G, and a D368H mutation relative to preprocessed wild-type Kumamolisin-As. As shown in the examples that follow, polypeptides containing this mutation have at least 50-fold improved protease activity at pH 4 against the oligopeptide PQPQLP (SEQ ID NO: 34) compared to wild type Kumamolisin-As.

In a further embodiment of this second aspect, the polypeptides comprise or consist of an amino acid sequence according to any one of SEQ ID NOS:5-32. Polypeptides according to these embodiments have all been demonstrated to show improved protease activity at pH 4 against the oligopeptide PQPQLP (SEQ ID NO: 34) compared to wild type Kumamolisin-As. In a preferred embodiment, the polypeptide comprises or consists of an amino acid sequence according to SEQ ID NO:32; this polypeptide is shown in the examples that follow to possess the most potent protease activity at pH 4 against the oligopeptide PQPQLP (SEQ ID NO: 34) of any of the polypeptides tested.

As used throughout the present application, the term "polypeptide" is used in its broadest sense to refer to a sequence of subunit amino acids, whether naturally occurring or of synthetic origin. The polypeptides of the invention may comprise L-amino acids, D-amino acids (which are resistant to L-amino acid-specific proteases in vivo), or a combination of D- and L-amino acids. The polypeptides described herein may be chemically synthesized or recombinantly expressed. The polypeptides may be linked to other compounds to promote an increased half-life in vivo, such as by PEGylation, HESylation, PASylation, or glycosylation. Such linkage can be covalent or non-covalent as is understood by those of skill in the art. The polypeptides may be linked to any other suitable linkers, including but not limited to any linkers that can be used for purification or detection (such as FLAG or His tags).

In a third aspect, the present invention provides isolated nucleic acids encoding the polypeptide of any aspect or embodiment of the invention. The isolated nucleic acid sequence may comprise RNA or DNA. As used herein, "isolated nucleic acids" are those that have been removed from their normal surrounding nucleic acid sequences in the genome or in cDNA sequences. Such isolated nucleic acid sequences may comprise additional sequences useful for promoting expression and/or purification of the encoded protein, including but not limited to polyA sequences, modified Kozak sequences, and sequences encoding epitope tags, export signals, and secretory signals, nuclear localization signals, and plasma membrane localization signals. It will be apparent to those of skill in the art, based on the teachings herein, what nucleic acid sequences will encode the polypeptides of the invention.

In a fourth aspect, the present invention provides nucleic acid expression vectors comprising the isolated nucleic acid of any embodiment of the invention operatively linked to a suitable control sequence. "Recombinant expression vector" includes vectors that operatively link a nucleic acid coding region or gene to any control sequences capable of effecting expression of the gene product. "Control sequences" operably linked to the nucleic acid sequences of the invention are nucleic acid sequences capable of effecting the expression of the nucleic acid molecules. The control sequences need not be contiguous with the nucleic acid sequences, so long as they function to direct the expression thereof. Thus, for example, intervening untranslated yet transcribed sequences can be present between a promoter sequence and the nucleic acid sequences and the promoter sequence can still be considered "operably linked" to the coding sequence. Other such control sequences include, but are not limited to, polyadenylation signals, termination signals, and ribosome binding sites. Such expression vectors can be of any type known in the art, including but not limited plasmid and viral-based expression vectors. The control sequence used to drive expression of the disclosed nucleic acid sequences in a mammalian system may be constitutive (driven by any of a variety of promoters, including but not limited to, CMV, SV40, RSV, actin, EF) or inducible (driven by any of a number of inducible promoters including, but not limited to, tetracycline, ecdysone, steroid-responsive). The construction of expression vectors for use in transfecting prokaryotic cells is also well known in the art, and thus can be accomplished via standard techniques. (See, for example, Sambrook, Fritsch, and Maniatis, in: Molecular Cloning, A Laboratory Manual, Cold Spring Harbor Laboratory Press, 1989; *Gene Transfer and Expression Protocols*, pp. 109-128, ed. E. J. Murray, The Humana Press Inc., Clifton, N.J.), and the Ambion 1998 Catalog (Ambion, Austin, TX). The expression vector must be replicable in the host organisms either as an episome or by integration into host chromosomal DNA. In a preferred embodiment, the expression vector comprises a plasmid. However, the invention is intended to include other expression vectors that serve equivalent functions, such as viral vectors.

In a fifth aspect, the present invention provides recombinant host cells comprising the nucleic acid expression vectors of the invention. The host cells can be either prokaryotic or eukaryotic. The cells can be transiently or stably transfected or transduced. Such transfection and transduction of expression vectors into prokaryotic and eukaryotic cells can be accomplished via any technique known in the art, including but not limited to standard bacterial transformations, calcium phosphate co-precipitation, electroporation, or liposome mediated-, DEAE dextran mediated-, polycationic mediated-, or viral mediated transfection. (See, for example, *Molecular Cloning: A Laboratory Manual* (Sambrook, et al., 1989, Cold Spring Harbor Laboratory Press; *Culture of Animal Cells: A Manual of Basic Technique*, $2^{nd}$ Ed. (R. I. Freshney. 1987. Liss, Inc. New York, NY). A method of producing a polypeptide according to the invention is an additional part of the invention. The method comprises the steps of (a) culturing a host according to this aspect of the invention under conditions conducive to the expression of the polypeptide, and (b) optionally, recovering the expressed polypeptide. The expressed polypeptide can be recovered from the cell free extract, cell pellet, or recovered from the culture medium. Methods to purify recombinantly expressed polypeptides are well known to the man skilled in the art.

In a sixth aspect, the present invention provides pharmaceutical compositions, comprising the polypeptide, nucleic acid, nucleic acid expression vector, and/or the recombinant host cell of any aspect or embodiment of the invention, and a pharmaceutically acceptable carrier. The pharmaceutical compositions of the invention can be used, for example, in the methods of the invention described below. The pharmaceutical composition may comprise in addition to the polypeptides, nucleic acids, etc. of the invention (a) a lyoprotectant; (b) a surfactant; (c) a bulking agent; (d) a tonicity adjusting agent; (e) a stabilizer; (f) a preservative and/or (g) a buffer.

In some embodiments, the buffer in the pharmaceutical composition is a Tris buffer, a histidine buffer, a phosphate buffer, a citrate buffer or an acetate buffer. The pharmaceutical composition may also include a lyoprotectant, e.g. sucrose, sorbitol or trehalose. In certain embodiments, the pharmaceutical composition includes a preservative e.g. benzalkonium chloride, benzethonium, chlorohexidine, phenol, m-cresol, benzyl alcohol, methylparaben, propylparaben, chlorobutanol, o-cresol, p-cresol, chlorocresol, phenylmercuric nitrate, thimerosal, benzoic acid, and various mixtures thereof. In other embodiments, the pharmaceutical composition includes a bulking agent, like glycine. In yet other embodiments, the pharmaceutical composition includes a surfactant e.g., polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste, or a combination thereof. The pharmaceutical composition may also include a tonicity adjusting agent, e.g., a compound that renders the formulation substantially isotonic or isoosmotic with human blood. Exemplary tonicity adjusting agents include sucrose, sorbitol, glycine, methionine, mannitol, dextrose, inositol, sodium chloride, arginine and arginine hydrochloride. In other embodiments, the pharmaceutical composition additionally includes a stabilizer, e.g., a molecule which, when combined with a protein of interest substantially prevents or reduces chemical and/or physical instability of the protein of interest in lyophilized or liquid form. Exemplary stabilizers include sucrose, sorbitol, glycine, inositol, sodium chloride, methionine, arginine, and arginine hydrochloride.

The polypeptides, nucleic acids, etc. of the invention may be the sole active agent in the pharmaceutical composition, or the composition may further comprise one or more other active agents suitable for an intended use.

The pharmaceutical compositions described herein generally comprise a combination of a compound described herein and a pharmaceutically acceptable carrier, diluent, or excipient. Such compositions are substantially free of non-pharmaceutically acceptable components, i.e., contain amounts of non-pharmaceutically acceptable components lower than permitted by US regulatory requirements at the time of filing this application. In some embodiments of this aspect, if the compound is dissolved or suspended in water, the composition further optionally comprises an additional pharmaceutically acceptable carrier, diluent, or excipient. In other embodiments, the pharmaceutical compositions described herein are solid pharmaceutical compositions (e.g., tablet, capsules, etc.).

These compositions can be prepared in a manner well known in the pharmaceutical art, and can be administered by any suitable route. In a preferred embodiment, the pharmaceutical compositions and formulations are designed for oral administration. Conventional pharmaceutical carriers, aqueous, powder or oily bases, thickeners and the like may be necessary or desirable.

The pharmaceutical compositions can be in any suitable form, including but not limited to tablets, pills, powders, lozenges, sachets, cachets, elixirs, suspensions, emulsions, solutions, syrups, aerosols (as a solid or in a liquid medium), ointments containing, for example, up to 10% by weight of the active compound, soft and hard gelatin capsules, sterile injectable solutions, and sterile packaged powders.

In a seventh aspect, the present invention provides methods for treating celiac sprue, comprising administering to an individual with celiac sprue an amount effective to treat the celiac sprue of one or more polypeptides selected from the group consisting of the polypeptides of the first or second aspects of the invention, SEQ ID NO:33, and SEQ ID NO:67.

The inventors of the present invention have unexpectedly discovered that Kumamolisin-As is capable of degrading proline (P)- and glutamine (Q)-rich components of gluten known as 'gliadins' believed responsible for the bulk of the immune response in most celiac sprue patients. The polypeptides of the invention show improved protease activity at pH 4 against the oligopeptide PQPQLP (SEQ ID NO: 34) (a substrate representative of gliadin) compared to wild type Kumamolisin-As.

In one embodiment, the one or more polypeptides comprise an amino acid sequence at least 75% identical to an amino acid sequence according to SEQ ID NO:35, wherein
(a) the polypeptide degrades a PQPQLP (SEQ ID NO:34) peptide at pH 4;
(b) residue 278 is Ser, residue 78 is Glu, and residue 82 is Asp.

In further embodiments, the one or more polypeptides comprise one or more amino acid changes from SEQ ID NO: 67 (wild type processed Kumamolisin-As) at one or more residues selected from the group consisting of residues 73, 102, 103, 104, 130, 165, 168, 169, 172, and 179 (numbering based on the wild type processed Kumamolisin-As amino acid sequence). In non-limiting embodiments, the one or more changes relative to the wild type processed Kumamolisin-As amino acid sequence (SEQ ID NO:67) are selected from the group consisting of:

| WT Residue# | AA change |
| --- | --- |
| S73 | K, G |
| N102 | D |
| T103 | S |
| D104 | A, T, N |
| G130 | S |
| S165 | N |
| T168 | A |
| D169 | N, G |
| Q172 | D |
| D179 | S, H |

In various further non-limiting embodiments, the one or more changes relative to the wild type processed Kumamolisin-As amino acid sequence include at least N102D. In another embodiment the one or more changes relative to the wild type Kumamolisin-As amino acid sequence include at least N102D and D169N or D169G. In another embodiment the one or more changes relative to the wild type Kumamolisin-As amino acid sequence include at least N102D, D169G, and D179H. In another embodiment the one or more changes relative to the wild type Kumamolisin-As amino acid sequence include at least S73K, D104T, N102D, G130S, D169G, and D179H.

In various preferred embodiment, the one or more polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to SEQ ID NO:35. In a further embodiment the polypeptides comprise or consist of an amino acid sequence according to SEQ ID NO:35.

In various further embodiments, the one or more polypeptides comprise or consist of an amino acid sequence at least 75% identical to any one of SEQ ID NOS:36-66. The polypeptides represented by these SEQ ID NOS are specific examples of polypeptides with improved protease activity at pH 4 against the oligopeptide PQPQLP (SEQ ID NO: 34) (a substrate representative of gliadin) compared to wild type Kumamolisin-As. In various preferred embodiment, the polypeptide s comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to any one of SEQ ID NOS:36-66.

In a further embodiment the polypeptides comprise or consist of an amino acid sequence according to any one of SEQ ID NOS:36-66.

In a preferred embodiment, the polypeptides for use in the methods of this aspect of the invention comprise an amino acid according to SEQ ID NO:33 or a polypeptide comprising one or more amino acid changes from SEQ ID NO: 33 (wild type preprocessed Kumamolisin-As) at one or more residues selected from the group consisting of residues 119, 262, 291, 292, 293, 319, 354, 357, 358, 361, and 368 (numbering based on the wild type Kumamolisin-As amino acid sequence). In non-limiting embodiments, the one or more changes relative to the wild type Kumamolisin-As amino acid sequence are selected from the group consisting of:

| WT Residue# | AA change |
| --- | --- |
| V119 | D |
| S262 | K, G |
| N291 | D |
| T292 | S |
| D293 | A, T, N |
| G319 | S |
| S354 | N |
| T357 | A |
| D358 | N, G |
| Q361 | D |
| D368 | S, H |

In various further non-limiting preferred embodiments, the one or more changes relative to the wild type Kumamolisin-As amino acid sequence include at least N291D. In another embodiment the one or more changes relative to the wild type Kumamolisin-As amino acid sequence include at least N291D and 358N or 358G. In another embodiment the one or more changes relative to the wild type Kumamolisin-As amino acid sequence include at least N291D, 358G, and 368H. In another embodiment the one or more changes relative to the wild type Kumamolisin-As amino acid sequence include at least V119D, S262K, D293T, N291D, G319S, D358G, and D368H.

In various preferred embodiment, the polypeptide s for use in the methods of this aspect of the invention comprise or consist of an amino acid sequence at least 76%, 77%, 78%, 79%, 80%, 81%, 82%, 83%, 84%, 85%, 86%, 87%, 88%, 89%0, 90%, 91%, 92%, 92%, 93%, 94%, 95%, 96%, 97%, 98%, or 99% identical to an amino acid sequence according to SEQ ID NO:1. In a further embodiment the polypeptides comprise or consist of an amino acid sequence according to SEQ ID NO:1.

In various further embodiments, the polypeptides for use in the methods of this aspect of the invention comprise or consist of an amino acid sequence at least 75% identical to any one of SEQ ID NOS:2-32. The polypeptides represented by these SEQ ID NOS are specific examples of polypeptides with improved protease activity at pH 4 against the oligopeptide PQPQLP (SEQ ID NO: 34) (a substrate representative of gliadin) compared to wild type Kumamolisin-As. In various preferred embodiment, the polypeptides for use in the methods of this aspect of the invention comprise or consist of an amino acid sequence at least 76%, 77%, 78%, 79%, 80%, 81%, 82%, 83%, 84%, 85%, 86%, 87%, 88%, 89%, 90%, 91%, 92%, 92%, 93%, 94%, 95%, 96%, 97%, 98%, or 99% identical to an amino acid sequence according to any one of SEQ ID NOS:2-32. In a further embodiment the polypeptides comprise or consist of an amino acid sequence according to any one of SEQ ID NOS:2-32.

In an eighth aspect, the present invention provides methods for treating celiac sprue, comprising administering to an individual with celiac sprue a polypeptide comprising an amount effective of amino acid sequence according to any one of SEQ ID NOS: 1-67 to treat the celiac sprue.

In one embodiment, the polypeptides administered comprise or consist of an amino acid sequence according to SEQ ID NO:2. Polypeptides according to SEQ ID NO:2 have a N291D mutation relative to wild-type Kumamolisin-As. As shown in the examples that follow, polypeptides containing this mutation have at least 10-fold improved protease activity at pH 4 against the oligopeptide PQPQLP (SEQ ID NO: 34) compared to wild type Kumamolisin-As.

In another embodiment of this second aspect, the polypeptides administered comprise or consist of an amino acid sequence according to SEQ ID NO:3. Polypeptides according to SEQ ID NO:3 have a N291D mutation and a D358N or D358G mutation relative to wild-type Kumamolisin-As. As shown in the examples that follow, polypeptides containing this mutation have at least 20-fold improved protease activity at pH 4 against the oligopeptide PQPQLP (SEQ ID NO: 34) compared to wild type Kumamolisin-As.

In another embodiment of this second aspect, the polypeptides administered comprise or consist of an amino acid sequence according to SEQ ID NO:4. Polypeptides according to SEQ ID NO:4 have a N291D mutation, a D358G, and a D368H mutation relative to wild-type Kumamolisin-As. As shown in the examples that follow, polypeptides containing this mutation have at least 50-fold improved protease activity at pH 4 against the oligopeptide PQPQLP (SEQ ID NO: 34) compared to wild type Kumamolisin-As.

In a further embodiment of this second aspect, the polypeptides administered comprise or consist of an amino acid sequence according to any one of SEQ ID NOS:5-32. Polypeptides according to these embodiments have all been demonstrated to show improved protease activity at pH 4 against the oligopeptide PQPQLP (SEQ ID NO: 34) compared to wild type Kumamolisin-As. In a preferred embodiment, the polypeptide administered comprises or consists of an amino acid sequence according to SEQ ID NO:32; this polypeptide is shown in the examples that follow to possess the most potent protease activity at pH 4 against the oligopeptide PQPQLP (SEQ ID NO: 34) of any of the polypeptides tested.

In another embodiment, the one or more polypeptides comprise an amino acid sequence according to SEQ ID NO:36. Polypeptides according to SEQ ID NO:36 have a N102D mutation relative to wild-type processed Kumamolisin-As. As shown in the examples that follow, polypeptides containing this mutation have at least 10-fold improved protease activity at pH 4 against the oligopeptide PQPQLP (SEQ ID NO: 34) compared to wild type Kumamolisin-As. In another embodiment, the one or more polypeptides comprise an amino acid sequence according to SEQ ID NO:37. Polypeptides according to SEQ ID NO:37 have a N102D mutation and a D169N or D169G mutation relative to wild-type processed Kumamolisin-As. As shown in the examples that follow, polypeptides containing this mutation have at least 20-fold improved protease activity at pH 4 against the oligopeptide PQPQLP (SEQ ID NO: 34) compared to wild type Kumamolisin-As. In another embodiment, the one or more polypeptides comprise an amino acid sequence according to SEQ ID NO:38. Polypeptides according to SEQ ID NO:38 have a N102D mutation, a D169G, and a D179H mutation relative to wild-type processed Kumamolisin-As. As shown in the examples that follow, polypeptides containing this mutation have at least 50-fold improved protease activity at pH 4 against the oligopeptide PQPQLP (SEQ ID NO: 34) compared to wild type Kumamolisin-As. In further embodiments, the one or more polypeptides comprise an amino acid sequence according to any one of SEQ ID NOS:39-66. Polypeptides according to these embodiments have all been demonstrated to show improved protease activity at pH 4 against the oligopeptide PQPQLP (SEQ ID NO: 34) compared to wild type Kumamolisin-As. In a preferred embodiment, the polypeptide comprises or consists of an amino acid sequence according to SEQ ID NO:66.

Celiac sprue (also known as celiac disease or gluten intolerance) is a highly prevalent disease in which dietary proteins found in wheat, barley, and rye products known as 'glutens' evoke an immune response in the small intestine of genetically predisposed individuals. The resulting inflammation can lead to the degradation of the villi of the small intestine, impeding the absorption of nutrients. Symptoms can appear in early childhood or later in life, and range widely in severity, from diarrhea, fatigue, weight loss, abdominal pain, bloating, excessive gas, indigestion, constipation, abdominal distension, nausea/vomiting, anemia, bruising easily, depression, anxiety, growth delay in children, hair loss, dermatitis, missed menstrual periods, mouth ulcers, muscle cramps, joint pain, nosebleeds, seizures, tingling or numbness in hands or feet, delayed puberty, defects in tooth enamel, and neurological symptoms such as ataxia or paresthesia. There are currently no effective therapies for this lifelong disease except the total elimination of glutens from the diet. Although celiac sprue remains largely underdiagnosed, its' prevalence in the US and Europe is estimated at 0.5-1.0% of the population.

As used herein, "treating celiac sprue" means accomplishing one or more of the following: (a) reducing the severity of celiac sprue; (b) limiting or preventing development of symptoms characteristic of celiac sprue; (c) inhibiting worsening of symptoms characteristic of celiac sprue; (d) limiting or preventing recurrence of celiac sprue in patients that have previously had the disorder; (e) limiting or preventing recurrence of symptoms in patients that were previously symptomatic for celiac sprue; and (f) limiting development of celiac sprue in a subject at risk of developing celiac sprue, or not yet showing the clinical effects of celiac sprue.

The individual to be treated according to the methods of the invention may be any individual suffering from celiac sprue, including human subjects. The individual may be one already suffering from symptoms or one who is asymptomatic.

As used herein, an "amount effective" refers to an amount of the polypeptide that is effective for treating celiac sprue. The polypeptides are typically formulated as a pharmaceutical composition, such as those disclosed above, and can be administered via any suitable route, including orally, parentally, by inhalation spray, or topically in dosage unit formulations containing conventional pharmaceutically acceptable carriers, adjuvants, and vehicles. In a preferred embodiment, the pharmaceutical compositions and formulations are orally administered, such as by tablets, pills, lozenges, elixirs, suspensions, emulsions, solutions, or syrups.

Dosage regimens can be adjusted to provide the optimum desired response (e.g., a therapeutic or prophylactic response). A suitable dosage range may, for instance, be 0.1 ug/kg-100 mg/kg body weight; alternatively, it may be 0.5 ug/kg to 50 mg/kg; 1 ug/kg to 25 mg/kg, or 5 ug/kg to 10 mg/kg body weight. The polypeptides can be delivered in a single bolus, or may be administered more than once (e.g., 2, 3, 4, 5, or more times) as determined by an attending physician.

EXAMPLES

Celiac disease is an autoimmune disorder that afflicts approximately 1% of the population[1,2]. This disease is characterized by an inflammatory reaction to gluten, the major protein in wheat flour, and to related proteins in barley and rye[2]. Gluten is composed of a heterogeneous mixture of the glycoproteins gliadin and glutenin[3]. Upon ingestion, α-gliadin is partially degraded by gastric and intestinal proteases to oligopeptides, which are resistant to further proteolysis due to their unusually high proline and glutamine content (FIG. 1). Immunogenic oligopeptides that result from incomplete proteolysis are enriched in the PQ motif[4,5](FIG. 1), which stimulate inflammation and injury in the intestine of people with Celiac disease. Currently the only treatment for this disease is complete elimination of gluten from the diet, which is difficult to attain due to the ubiquity of this protein in modern food products[6].

Oral enzyme therapy (OET) in which orally administered proteases are employed to hydrolyze immunogenic peptides before they are capable of triggering inflammation is currently being explored as a treatment for gluten intolerance. For this purpose, several different proteases have been considered due to their specificity for cleavage after either proline or glutamine residues[4,7-9]. However, these enzymes often demonstrate characteristics that hinder their use in OET for gluten degradation. Most of these peptidases exhibit optimal catalytic activity at neutral pH; however, the pH of the human stomach ranges from 2 to 4. These enzymes are therefore most active when they reach the pH-neutral small intestine, which is too late for effective prevention of Celiac disease as this is the site where gluten-derived pathology develops[2,10]. Additionally, several of these enzymes demonstrate instability in the low pH of the human stomach, are susceptible to proteolysis by digestive proteases, or require extensive refolding procedures during their purification[7,11], which are all characteristics that hamper efforts for clinical use.

The ideal protease for the application of OET in the treatment of gluten intolerance would combine the following traits: optimal activity at low pH, easy purification, stability under the conditions of the human stomach, and high specificity for amino acid motifs found in gluten-derived immunogenic oligopeptides. Here we report the engineering of an endopeptidase that demonstrates these traits. We identified a protease that is highly active in acidic conditions, Kumamolisin-As (KumaWT) from the acidophilic bacterium *Alicyclobacillus sendaiensis*, and used computational modeling tools to engineer it toward the desired oligopeptide specificity. The computationally designed enzyme, designated KumaMax™, exhibited over 100-fold increased proteolytic activity and an 800-fold switch in substrate specificity for the targeted PQ motif compared to wild-type KumaWT. In addition, KumaMax™ demonstrates resistance to common gastric proteases and is produced at high yields in *E. coli* without the need for refolding. Thus, this protease and others reported herein represent promising therapeutic candidates for Celiac disease.

Results

Selection and Computational Design of an α-Gliadin Endopeptidase

In order to engineer a novel protease that can degrade gluten peptides under gastric conditions, we first focused on identifying an appropriate protease as a starting point for our engineering efforts. Ideally, the template protease would combine stability and activity at low pH with demonstrated specificity for a dipeptide amino acid motif We identified the enzyme Kumamolisin-As (KumaWT) as a template, since this protease naturally has an optimal activity over the pH range of 2-4[11], which matches the approximate pH ranges in the human stomach before and after a meal is ingested (pH 2 and 4, respectively)[13]. KumaWT also demonstrates high stability and activity at the physiologically relevant temperature 37° C.[14]. In addition, the purification of this enzyme is straightforward and yields significant quantities using standard recombinant protein production methods in *E. coli*[14], an important property both for screening mutant libraries and for its ultimate generation in large batches for use in OET. Finally, KumaWT naturally recognizes a specific dipeptide motif as opposed to single amino acid specificity[14]. This is an important property for an oral protease therapeutic meant to be taken during digestion, since dipeptide specificity should result in reduced competitive inhibition by other food-derived peptides in the stomach.

An effective OET for Celiac disease would likely demonstrate specificity for Proline-Glutamine (PQ), due to the frequent occurrence of this dipeptide in immunogenic gluten-derived oligopeptides (FIG. 1). KumaWT has a strong specificity for proline at the P2 position of its peptide substrate, matching one of the amino acid residues of interest for the degradation of immunogenic α-gliadin peptides. In the P1 site, KumaWT has been established to prefer the positively charged amino acids arginine or lysine[14]. Despite this preference, KumaWT is also capable of recognizing glutamine at the P1 position, albeit at a significantly decreased level compared to its recognition of arginine or lysine[14]. This slight innate proclivity to recognize glutamine at the P1 position suggests that KumaWT may be amenable to re-engineering to prefer glutamine at this position. At the P1' site, KumaWT demonstrates broad specificity, which is desirable since the residue in the position after the PQ motif varies among the different immunogenic peptides, as depicted in FIG. 1.

Given these characteristics of KumaWT, our primary goal was to computationally redesign the S1 binding pocket of KumaWT such that it would prefer a PQ dipeptide motif over the native PR or PK substrates. Using the Rosetta Molecular Modeling Suite, we modeled the PR dipeptide in the S1 binding pocket of KumaWT using this enzyme's solved crystal structure (PDB ID: 1T1E). This revealed that two negatively-charged amino acids, D358 and D368, likely facilitate binding of the positively charged amino acids in the P1 position (FIG. 2A). The native specificity for proline at P2 appears to be derived in large part from a hydrophobic interaction of this amino acid residue with the aromatic ring of W318 in the S2 pocket of the enzyme. As specificity of the P1 position for proline is desired in our enzyme variant, we maintained this native tryptophan during the design of the S1 pocket.

To redesign the KumaWT substrate specificity of the S1 pocket to prefer glutamine at the P1 position, we generated theoretical mutations in the KumaWT binding pocket using the Foldit interface to the Rosetta Molecular Modeling Suite. A tetrapeptide that represents a common immunogenic motif found throughout α-gliadin, PQLP (SEQ ID NO: 68), was modeled into the P2 to P2' active site positions. This structure already contained a polypeptide bound in the active site, so the residues of this polypeptide were mutated using Rosetta to the PQLP (SEQ ID NO: 68) tetrapeptide motif. A total of 75 residues within an 8 Å sphere of the tetrapeptide were randomized to any of the 20 naturally occurring amino acids in order to find mutations that would favor binding of glutamine in the S1 pocket. These mutations were accepted if the overall energy of the new enzyme-PQLP substrate complex was either reduced relative to the native substrate, or was not increased by more than 5 Rosetta energy units. To accommodate the smaller, neutral amino acid glutamine, we focused our computational efforts on 1) removing the negative charge of the S1 pocket during the design process, 2) filling in open space that resulted from the replacement of the large amino acid arginine with glutamine, and 3) providing hydrogen bonds to the amide functional group of the glutamine. This computational modeling yielded 107 novel designs containing from 1 to 7 simultaneous mutations. These designed proteins were then constructed and their catalytic activity against a PQLP (SEQ ID NO: 68) peptide was assessed.

In order to test the activity of each of these designed proteases against the PQLP (SEQ ID NO: 68) motif, the desired mutations were incorporated into the native nucleotide sequence using site directed mutagenesis, and mutant enzyme variants were produced in *E. coli* BL21(DE3) cells. These enzyme variants were then screened for enzymatic activity in clarified whole cell lysates at pH 4 using the fluorescently quenched α-gliadin hexapeptide analogue QXL520-PQPQLP-K(5-FAM)-NH2 (FQ) (SEQ ID NO: 69) as a substrate. Of the 107 enzyme variants tested in this assay, 13% resulted in a loss of enzymatic function, 32% did not demonstrate a significant difference in activity relative to KumaWT, and 55% resulted in an increase in observed activity against this substrate. Twenty-eight of the most promising enzyme variants that exhibited a significant increase in activity in cell lysates were then purified in order to obtain an accurate comparison of enzymatic activity to that of KumaWT. After purification and correction for protein concentration, the activities of these enzymes ranged from 2-fold to 120-fold more active than KumaWT (Table 1). The most active variant, which was named KumaMax™, was selected for further characterization.

TABLE 1

Fold change in hydrolytic activity on PQ motif of all purified and sequenced mutants, relative to wild type Kumamolysin-As.

| Mutations to Wild Type Kumamolysin-As (Preprocessed) | Fold Change in Activity of PQ Hydrolysis Relative to Wild Type Kumamolysin-As |
|---|---|
| Wild Type (WT) | 1.0 |
| T357A | 2.0 |
| G319S, D368S | 2.0 |
| D358G | 3.0 |
| D293A | 3.0 |
| D358N | 4.0 |
| G319S, S354N, D358G, D368H | 5.0 |
| D358G, D368H | 6.0 |
| G319S, D358G, D368H | 7.0 |
| N291D, Q361D | 7.5 |
| S354N, D358G, D368H | 9.0 |
| N291D | 10.0 |
| N291D, D293A, Q361D, D358N | 14.8 |
| N291D, D293A | 15.0 |
| N291D, D293A, D358G, Q361D | 15.0 |
| N291D, D358N | 18.9 |
| N291D, Q361D, D358G | 20.0 |
| N291D, G319S, D358G, Q361D, D368H | 23.1 |
| N291D, D293A, D358N | 24.0 |
| S262G, T292S, N291D, G319S, D358G, D368H | 29.0 |
| N291D, D293A, G319S, D358G, Q361D, D368H | 40.9 |
| T292S, N291D, G319S, D358G, D368H | 49.0 |
| N291D, G319S, S354N, D358G, Q361D, D368H | 50.0 |
| N291D, G319S, S354N, D358G, D368H | 54.6 |
| N291D, D293A, G319S, S354N, D358G, Q361D, D368H | 58.0 |
| D293T, N291D, G319S, D358G, D368H | 58.0 |
| S262K, D293N, N291D, G319S, D358G, D368H | 62.0 |
| N291D, G319S, D358G, D368H | 93.0 |
| V119D, S262K, D293T, N291D, G319S, D358G, D368H | 120.0 |

These are the fold-change results (calculated as described in Supplementary Table 1) for all mutants that were purified, sequenced, and tested against wild-type Kumamolysin in the pure protein assay. The assay took place at pH 4, with enzyme final concentration of 0.0125 mg/mL and substrate concentration of 5 µM.

Figure 2:
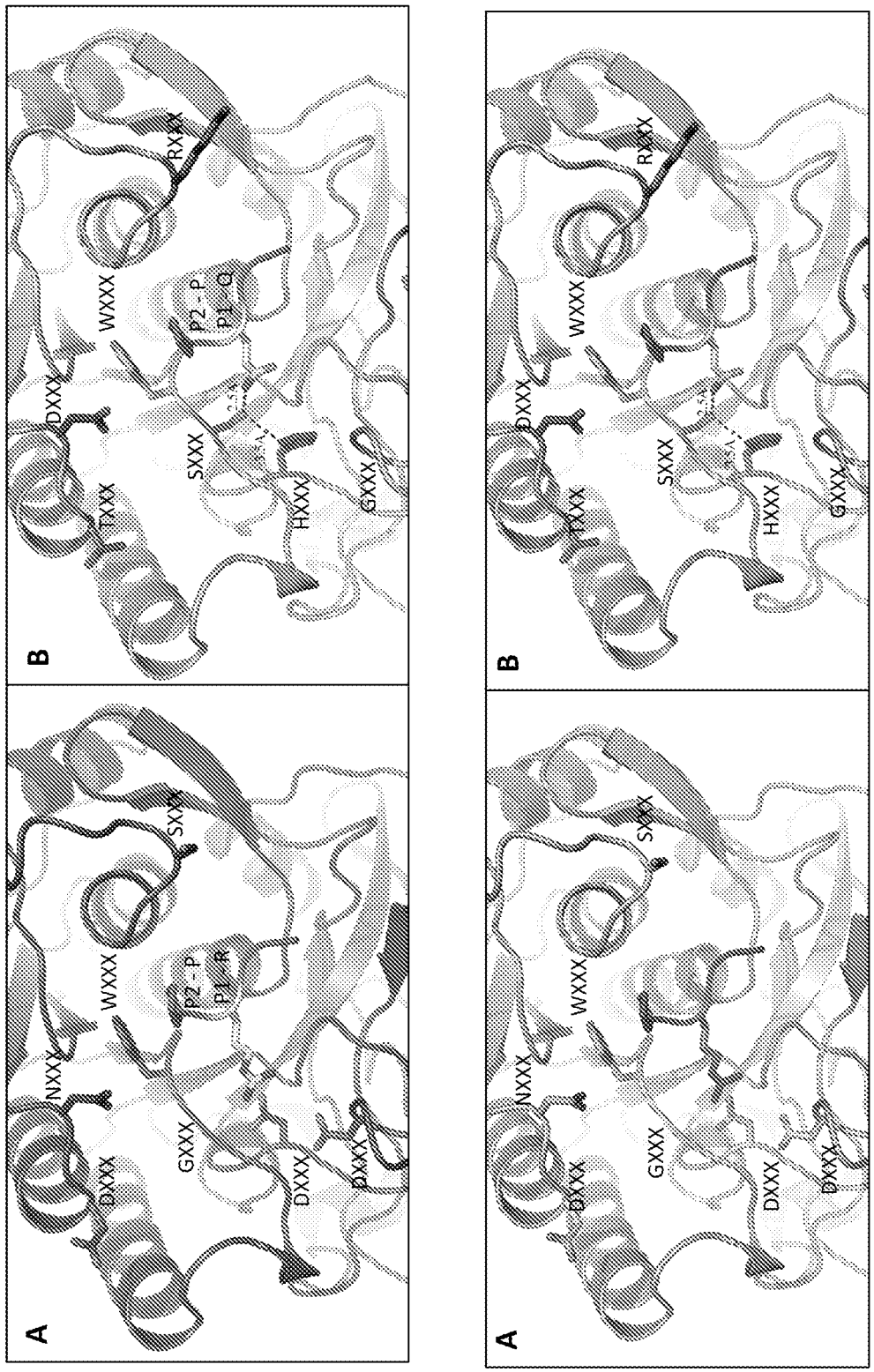
FIG. 2. Computational models of the peptide binding sites for KumaWT and KumaMax™. A) KumaWT in complex with a PR dipeptide motif. B) KumaMax™ in complex with the designed PQ dipeptide motif. Computationally designed residues in the active site are labeled and highlighted in sticks. The modeled peptides were based on a bound form of Kumamolisin-AS (PDB ID: 1T1E) and final structures were generated using the Rosetta Molecular Modeling Suite. Images were generated using PyMol v1.5.

KumaMax™ contains seven mutations from the wild-type amino acid sequence: V119D, S262K, N291D, D293T, G319S, D358G, D368H (FIG. 2B). Of these, the mutations G319S, D358G, and D368H appear to synergistically introduce a new hydrogen bond with the desired glutamine residue at position P1. As modeled, the G319S mutation appears to introduce a hydroxyl group that is located 2.5 Å from the carbonyl oxygen of the glutamine amide, potentially contributing a new hydrogen bond that interacts with glutamine in the P1 pocket. The D368H mutation is predicted to stabilize the serine hydroxyl, and its position in the active site is in turn sterically allowed by the D358G mutation. In addition to providing a novel desired interaction with glutamine as modeled, these three mutations also remove the two acidic residues predicted to stabilize the positively charged arginine residue in the native KumaWT substrate (FIG. 2). V119D, which was unexpectedly incorporated during site directed mutagenesis, is located in the propeptide domain and therefore does not affect catalytic activity of the mature enzyme. The other three mutations do not make direct contacts with residues in the P2-P2' pockets, and therefore likely introduce interactions with other components of the hexapeptide, the fluorophore, or the quencher. It is clear that these mutations are important for the overall catalytic enhancement observed, as the G319S/D358G/D368H triple mutant alone demonstrated only a 7-fold increase in catalytic activity over KumaWT; roughly 17-fold lower than that determined for KumaMax™

Kinetic Characterization and Substrate Specificity

The catalytic efficiencies for KumaMax™ and KumaWT against the FQ immunogenic gluten substrate analogue, as calculated by fitting a velocity versus substrate curve over 6-100 µM substrate, were found to be 568 $M^{-1}s^{-1}$ and 4.9 $M^{-1}s^{-1}$, respectively (Table 2) These values are consistent with the observation that KumaMax™ demonstrated a 120-fold increase in enzymatic activity towards the FQ substrate in the initial activity screen mentioned above. Unfortunately, no significant saturation of velocity at these substrate concentrations was observed, and therefore the individual kinetic constants $k_{cat}$ and $K_M$ could not be determined. This is not surprising since previous analyses of the kinetic constants of KumaWT report a Km of 40 μM. Therefore, no significant saturation would be expected at substrate concentrations less than 100 μM.

KumaWT demonstrated significantly lower levels of activity on the three other peptide substrates. While catalytic activity of KumaWT on the PQ dipeptide motif has previously been reported[14], no significant activity on the PQ dipeptide substrate was observed in this assay, which may be due to disruptive effects of pNA on the binding of this peptide to the enzyme active site. Both enzymes demonstrated activity towards the isosteric substrate PE, which is predicted to have neutral charge at pH 4; however, KumaMax™ demonstrated a roughly 5-fold decrease in activity on the PE peptide

TABLE 2

Kinetic Constants of peptide substrates for KumaMax ™ and KumaWT.

| | Catalytic Efficiency $M^{-1}s^{-1}$ | | | | |
|---|---|---|---|---|---|
| | Qu-PQPQLP-Fl | Suc-APQ-pNA | Suc-APR-pNA | Suc-APE-pNA | Suc-AQP-pNA |
| KumaWT | 4.9 ± 0.2 | n.d. | 131.8 ± 3.8 | 4.0 ± 0.1 | n.d. |
| KumaMax ™ | 568.5 ± 14.6 | 6.7 ± 0.4 | n.d. | 1.4 ± 0.2 | n.d. |

The catalytic efficiency ($k_{cat}/K_M$ $M^{-1}s^{-1}$) for both KumaWT and KumaMa™ for the fluorescently (Fl) quenched (Qu) PQPQLP (SEQ ID NO: 34) peptide was fit to a linear curve as no saturation was observed up to 100 μM substrate. The fluorescence signal was quantified as described in Materials and Methods with a standard curve that accounted for substrate quenching of product fluorescence. The catalytic efficiency for the pNA-linked peptides was determined in a similar manner, and is described in the Materials and Methods. All fits had at least six independently measured rates with an $R^2$ greater than 0.9. n.d. not detected.

While the increased activity of KumaMax™ compared to KumaWT against the fluorescently quenched PQPQLP (SEQ ID NO: 34) hexapeptide substrate suggests that KumaMax™ has increased preference for a PQ dipeptide motif, it does not report directly on substrate specificity. To confirm that the specificity of KumaMax™ had indeed been altered to prefer the PQ dipeptide over the native PR dipeptide of KumaWT, four peptides in the form of Succinyl-Alanine-P2-P1-P1' were provided as substrates to both enzymes in order to assess P2 and P1 specificity. These peptides contained the reporter p-nitroaniline (pNA) at the P1' position, which allows for a spectrometric readout of peptide cleavage. The four peptides harbored the following amino acids at the P2 and P1 positions, respectively: proline-glutamine (PQ), proline-arginine (PR), glutamine-proline (QP), and proline-glutamate (PE). Catalytic efficiencies were calculated for each substrate and are reported in Table 2. As in the determination of catalytic activities against the FQ substrate, no saturation of activity on these peptides by KumaWT or KumaMax™ was observed. This suggests that the pNA group may partially disrupt binding in the P1' pocket, since substrate concentrations up to 1 mM were tested, well beyond saturation levels previously reported for alternative Kuma WT substrates.

In this specificity assay, KumaMax™ demonstrated its highest level of activity on the PQ substrate, the dipeptide that it had been designed to prefer. While KumaMax™ was not explicitly designed to demonstrate a decrease in specificity for the PR motif or for other motifs, its increased specificity for PQ could decrease its activity for non-targeted motifs. Indeed, KumaMax™ exhibited no significant catalytic activity against the QP or PR substrates in this assay (Table 2). Consistent with previous reports[14], KumaWT exhibited its highest level of activity on the PR motif substrate compared to its activity on the PQ substrate, which illustrates its exquisite selectivity for the PQ dipeptide motif.

As discussed previously, there are several enzymes currently being explored as OET for Celiac disease. Two of these enzymes are engineered forms of the prolyl endopeptidase SC PEP and the glutamine-specific endoprotease EP-B2[15]. To compare the catalytic efficiencies of these proteases to that of KumaMax™, the native SC PEP and EP-B2 enzymes were expressed in E. coli BL21(DE3) cells, purified, and their catalytic activities assessed. SC-PEP demonstrated a catalytic efficiency of 1.6 $M^{-1}s^{-1}$ on the FQ gluten substrate analogue at pH 4, which represents a roughly 350-fold lower level of activity on this substrate than KumaMax™. At pH 4, SC PEP did not exhibit any significant activity on any of the four pNA linked peptide substrates, including QP. Although previous studies using similar pNA-linked peptides have demonstrated activity of SC PEP on these substrates, those assays were performed at a pH of 4.5 or higher[15]. Like other groups, we found that SC PEP demonstrated significant levels of activity on the QP substrate at pH 7, with a catalytic efficiency of 2390 $M^{-1}s^{-1}$, thereby confirming that this recombinant SC PEP was fully functional (data not shown). This is consistent with previous literature reporting that SC PEP has low to negligible levels of catalytic activity in the pH range of the stomach, and is thus only expected to be effective once α-gliadin peptides have reached the small intestine[15,16].

For EP-B2, only very low levels of activity were detected on the FQ substrate at pH 4, and no activity on any of the four pNA peptide substrates was observed (data not shown). This is inconsistent with previous reports of EP-B2 activity using comparable substrates[11]. EP-B2 is a difficult enzyme to purify, as it forms inclusion bodies in E. coli and requires refolding to obtain active enzyme. We were unable to obtain soluble protein using previously reported methods for the refolding of EP-B2[11-17,18], so we used an on-column refolding process which resulted in soluble protein produced. Although this soluble EP-B2 demonstrated the expected self-processing activity at pH 41 (data not shown), the lack of activity of this enzyme suggests that it may not have refolded properly using our methods. This could be due to alternative N and C-terminal tags arising from the use of different protein expression vectors and warrants further investigation.

Protease Stability

In addition to demonstrating catalytic activity at low pH, any protein therapeutic intended for use in the human digestive tract must exhibit resistance to degradation by digestive proteases. Two of the most abundant proteases in the stomach and small intestine are pepsin and trypsin, respectively. Pepsin demonstrates optimal proteolytic activity at the low pH range of the stomach, while trypsin is primarily active at the more neutral pH of the small intestine. To assess the resistance of KumaMax™ to degradation by these proteases, 0.01 or 0.1 mg/mL of KumaMax™ were incubated with each protease, in their respective optimal pH ranges, at 0.1 mg/mL, which is a physiologically relevant concentration of both pepsin and trypsin. SC PEP and EP-B2 were included as controls, as EP-B2 has been established to be resistant to pepsin but susceptible to trypsin, and SC PEP demonstrates susceptibility to both proteases[11,15]. Each protein was incubated in the presence or absence of the respective protease for 30 minutes, after which the proteins were heat inactivated and the remaining non-proteolyzed fraction determined using an SDS-PAGE gel (FIG. 3).

Figure 3:
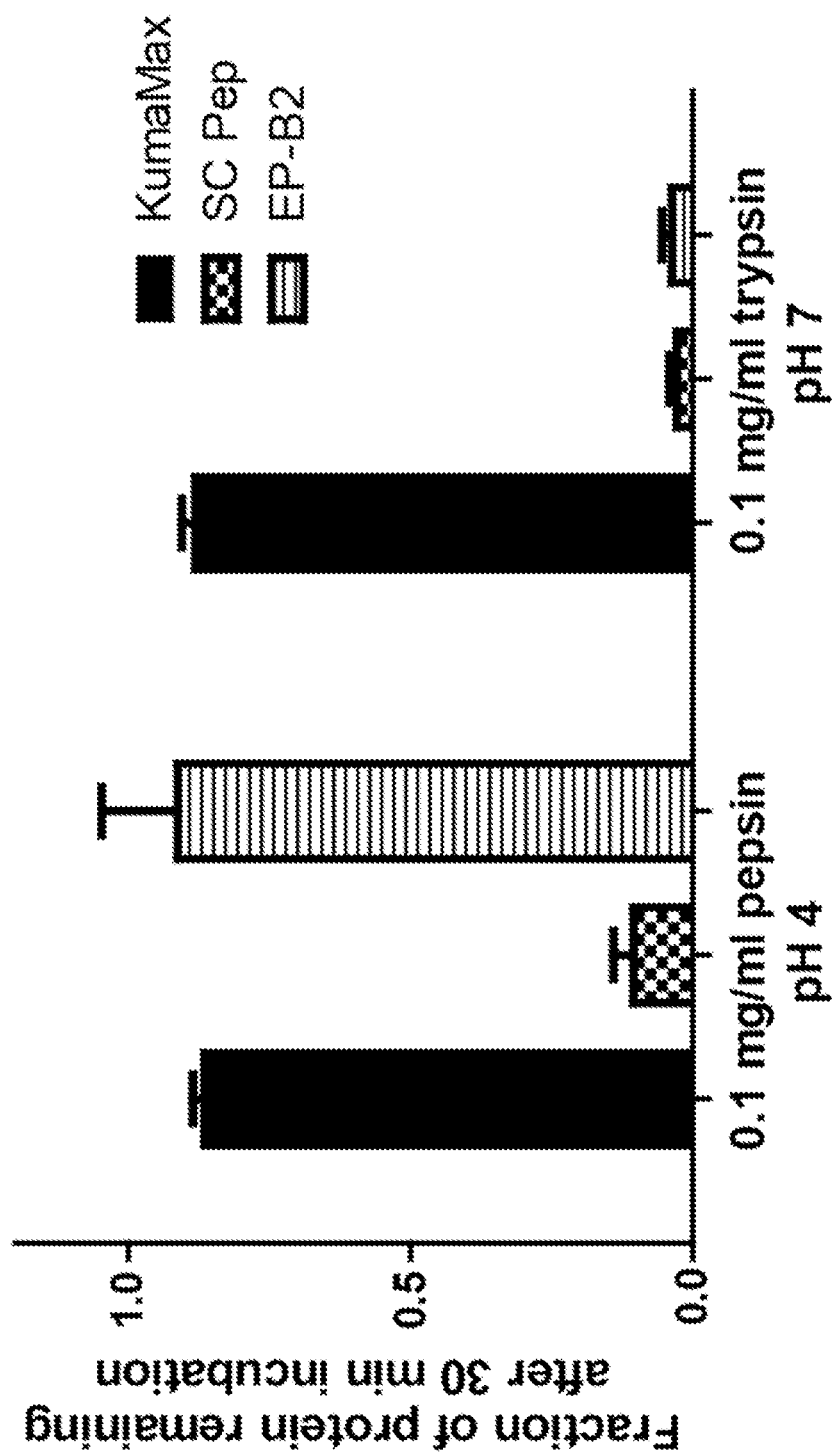
FIG. 3. Protein stability after incubation with pepsin or trypsin. Stability was measured by quantifying the relative remaining fraction of intact protein as observed on an SDS-PAGE gel after 30 minutes of incubation in the presence or absence of pepsin or trypsin at the pH indicated. Each protein was measured in triplicate and the error bars represent the standard deviation. Quantification was performed in ImageJ™.

In this assay, KumaMax™ demonstrated high stability against both pepsin and trypsin, with roughly 90% intact protein remaining after the half hour incubation with either protease (FIG. 3). Consistent with previous reports, SC PEP exhibited susceptibility to both pepsin and trypsin, with less than 20% of the enzyme remaining after incubation with these proteases. As expected, trypsin efficiently proteolyzed EP-B2 with less than 10% remaining after incubation, but no significant degradation of EP-B2 was observed in the presence of pepsin. To confirm that observed protein degradation was due to protease activity and not to enzymatic self-processing, each enzyme was incubated at either pH 4 or 7 and apparent proteolysis was analyzed in the absence of other proteases over the course of an hour (data not shown). KumaMax™ and EP-B2, but not SC PEP, demonstrated self-processing from the pro-peptide to the active enzyme form in fewer than 10 minutes at pH 4. All three proteins remained >90% stable over the course of the hour. None of these proteins showed significant levels of self-processing or proteolysis during incubation for one hour at pH 7.

Degradation of an Immunogenic α9-Gliadin Peptide

The significant level of catalytic activity exhibited by KumaMax™ on immunogenic peptide analogues (Table 2) demonstrates promise for the use of KumaMax™ as a therapeutic in OET for gluten intolerance. However, these assays do not directly assess the ability of this enzyme to degrade relevant immunogenic peptides derived from gluten. Therefore, we examined the direct proteolytic activity of KumaMax™ towards an immunodominant peptide present in α9-gliadin, QLQPFPQPQLPY (SEQ ID NO: 70).

Figure 4:
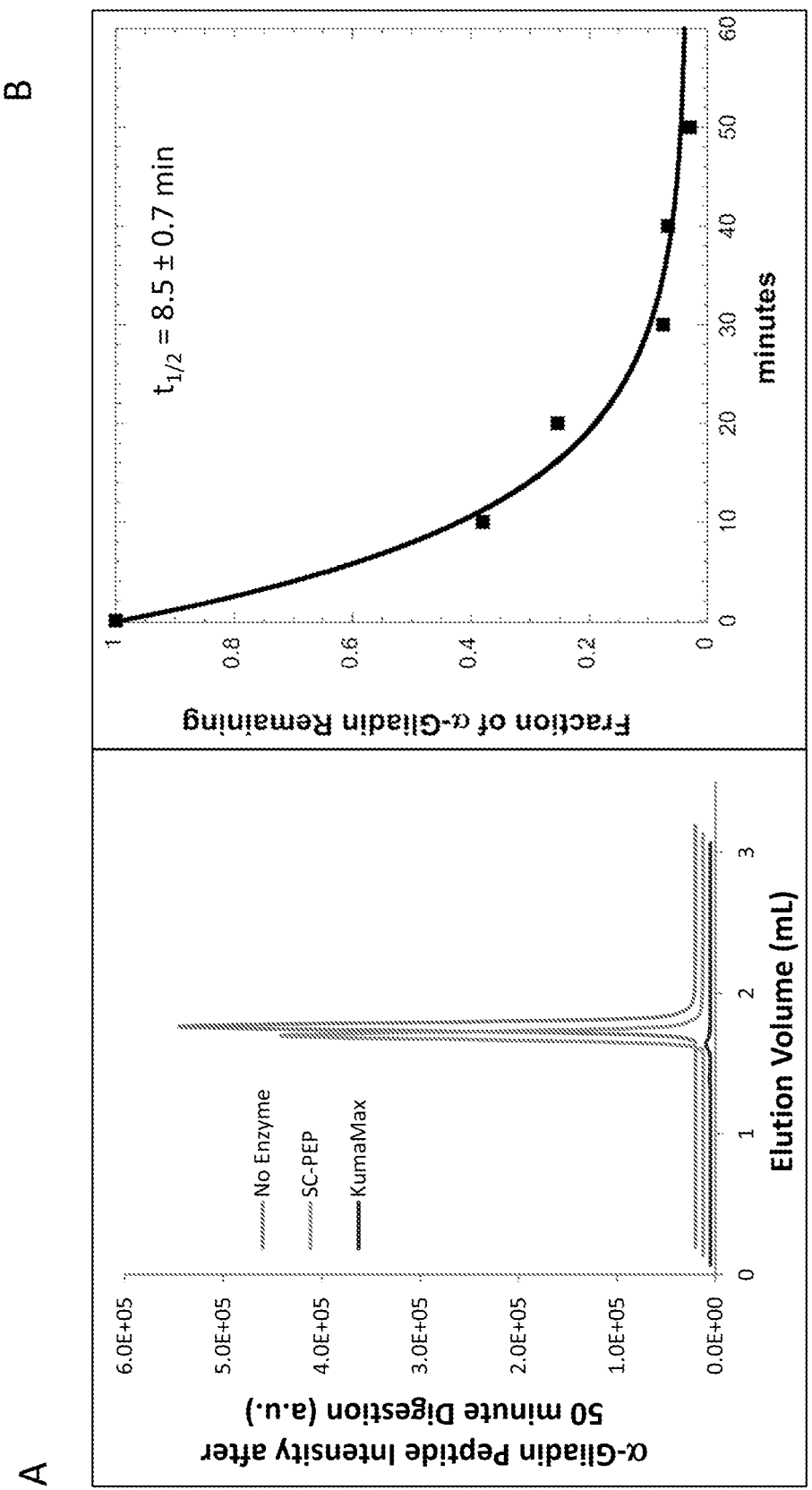
FIG. 4. An immunogenic α9-gliadin peptide is degraded by KumaMax™. A) Reaction chromatograms measuring the abundance of the M+H ion of the parent α9-gliadin peptide after 50 minutes of incubation with no enzyme, SC PEP, or KumaMax™. B) The fraction of α9-gliadin peptide remaining in the presence of KumaMax™ as a function of incubation time at pH 4. The data was fit using a standard exponential decay function. The $R^2$ value was greater than 0.9.

KumaMax™ was incubated with 500 µM of the α9-gliadin peptide at 37° C. in pH 4 at roughly a 1:100 enzyme to peptide molar ratio, which represents a physiologically relevant concentration of this peptide in the human stomach. SC PEP was included in this experiment for the sake of comparison, since this enzyme demonstrates significantly less activity against the FQ substrate than KumaMax™. Samples from the incubation were quenched every 10 minutes in 80% acetonitrile to halt the proteolysis reaction. The remaining fraction of intact immunogenic peptide was determined using high-performance liquid-chromatography mass spectroscopy, in which the M+H parent ion of the α9-gliadin peptide was monitored. KumaMax™ demonstrated a high level of activity against the immunogenic peptide in this assay, as over 95% of the immunogenic peptide had been proteolyzed after a 50 minute incubation with KumaMax™, while no significant degradation of the peptide was observed in the presence of SC PEP or in the absence of protease (FIG. 4A). The half-life of the peptide in the presence of KumaMax™ was determined by plotting the fraction of peptide remaining against the incubation time, and was calculated to be 8.5±0.7 minutes (FIG. 4B).

DISCUSSION

Enzyme therapy is an attractive method for the treatment of Celiac disease since this form of treatment would not require intravenous injection. However, it is a challenge to identify an appropriate protease for use in OET that demonstrates all the properties necessary to be an effective therapeutic for Celiac disease. Specifically, an ideal protease for use in OET would maintain activity in a pH range from 2-4 at 37° C. and would resist degradation by common digestive proteases. In addition, the protein therapeutic would ideally demonstrate stringent specificity for a common motif found in immunogenic gluten-derived peptides. Finally, the protein should be easily produced using recombinant methods. While it is unlikely that a single natural enzyme will encompass all of these properties, we demonstrate that a protein containing several of these important characteristics can be engineered to demonstrate the lacking qualities through computational analysis, mutagenesis, and screening.

The engineered protease, KumaMax™, demonstrated a high level of activity on, and specificity towards, the desired PQ dipeptide motif (Table 2). The specificity for the PQ motif, as opposed to the native PR motif, potentially derives from the addition of new hydrogen bonds in the S1 pocket of KumaMax™ that, as modeled, make direct contacts with the glutamine in this dipeptide motif (FIG. 2B). This specificity switch not only directs activity against a motif found commonly throughout gluten, but it also greatly decreases activity against non-targeted substrates (Table 2). The inability for an oral protease to recognize non-targeted substrates is an important characteristic as it reduces competitive inhibition by the large number of other peptides produced in the stomach during digestion of a meal. KumaMax™ or KumaWT can potentially act as platforms for engineering greater specificity, as KumaWT has demonstrate some level of selectivity beyond the P2 and P1 sites[14]. Using this method, a panel of customized proteases specific for unique immunogenic epitopes could be generated.

Methods

Protein Expression and Purification

The genes encoding each protein of interest, harbored in the pET29b plasmid, were transformed into *Escherichia coli* BL21 (DE3) cells. Individual colonies were picked, inoculated into Terrific Broth™ with 50 µg/µL Kanamycin (TB+Kan), and incubated overnight at 37° C. 500 µL of the overnight culture was added to 500 mL autoinduction media (5 g tryptone, 2.5 g yeast extract, 465 mL ddH2O), and shaken at 37° C. for roughly 4 hours, then the autoinduction components were added (500 uL MgSO$_4$, 500 uL 1000× trace metals, 25 mL 20× NPS, 10 mL 20× 5052, 500 uL 50 mg/mL Kan). The cultures were then shaken at 18° C. for 30 hours before being spun down. Pellets were resuspended in 10 mL 1× PBS, then lysed via sonication with 5 mL lysis buffer (50 mM HEPES, 500 mM NaCl, 1 mM bME, 2 mg/mL lysozyme, 0.2 mg/ml DNase, ddH2O) and spun down. The proteins were then purified over 1 mL TALON cobalt affinity columns. KumaMax™, KumaWT, and SC Pep were washed three times with 20 mL wash buffer (10 mM imidazole, 50 mM HEPES, 500 mM NaCl, 1 mM bME, ddH2O), and then eluted in 15 mL of elution buffer (200 mM imidazole, 50 mM HEPES, 500 mM NaCl, 1 mM bME). EP-B2 had to be refolded on the column, so after lysis the pellets were resuspended in 10 mL of EP-B2 buffer, which differs from the wash buffer only in that it is diluted in guanidine hydrochloride instead of ddH2O to allow for denaturation of the EP-B2 inclusion bodies. This resuspension was pelleted, and the supernatant (containing denatured EP-B2) was filtered with a 0.8 µm filter onto the column. EP-B2 was washed once with 20 mL of the EP-B2 buffer, before being washed twice with 20 mL of the wash buffer to refold the protein on the column. Protein was eluted with 15 ml of the elution buffer. All proteins were concentrated from 15 mL down to ~500 uL, then dialyzed once in 1 L dialysis buffer (20% glycerol, 50 mM HEPES, 500 mM NaCl, 1 mM bME). Protein concentration was calculated spectrophotometrically with extinction coefficients of 53,985 $M^{-1}$ $cm^{-1}$ for KumaWT and all KumaWT variants, 152,290 $M^{-1}$ $cm^{-1}$ for SC Pep, and 58,245 $M^{-1}$ $cm^{-1}$ for EP-B2.

Screening Method

Kunkel mutagenesis was used to generate mutations to KumaWT. Individual colonies picked from plates were grown up in 96-deep well plates. After lysing the cells with Triton buffer (1% 100× Triton, 1 mg/mL lysozyme, 0.5 mg/mL DNase, 1×PBS), the supernatant was adjusted to pH 4 with a 100 mM sodium acetate buffer. To crudely screen for activity against the FQ substrate, 10 uL of supernatant was added to 90 uL of 5 µM substrate in a 96-well black plate, and the fluorescence was measured at 30-second intervals for 1 hour.

Purified Enzyme Assay

The variants of Kumamolisin-As that displayed the most activity on the FQ substrate in the activity screen were sequenced, then purified in small scale. 500 uL of TB+Kan overnight cultures were added to 50 mL TB+Kan and grown at 37° C. until reaching an optical density of 0.5-0.8. IPTG was added to 0.5 mM, and the cultures were expressed at 22° C. for 16-24 hours. The cells were spun down, resuspended in 500 uL of wash buffer (1×PBS, 5 mM imidazole, ddH$_2$O), transferred to a 2 mL Eppendorf tube, and lysed in 1 mL lysis buffer (1×PBS, 5 mM imidazole, 2× Bug Buster™, 2 mg/mL lysozyme, 0.2 mg/mL DNase, ddH$_2$O). After centrifugation, the supernatant was decanted into a fresh tube. Columns with 200 uL of TALON cobalt resin were placed in Eppendorf tubes, and the supernatant was poured over the columns and rocked for 20 minutes before spinning down and discarding the flow-through. The proteins were washed three times with 500 uL wash buffer, discarding the flow-through between washes. Enzymes were eluted in 200 uL elution buffer (1×PBS, 200 mM imidazole, dd H$_2$O), and concentrations were calculated spectrophotometrically using an extinction coefficient of 53,985 $M^{-1}$ $cm^{-1}$.

For the assay, the Kumamolisin-As mutants were incubated for 15 minutes in pH 4 100 mM sodium acetate buffer. Enzyme was added to 5 µM substrate so that the final protein concentration was 0.0125 mg/mL. The fluorescence was measured at 30-second intervals for 1 hour.

Kinetic Characterization

Enzyme variant proclivity for gluten degradation was measured by hydrolysis of the fluorescently quenched α-gliadin hexapeptide analogue QXL520-PQPQLP-K(5-FAM)-NH2 (FQ) (SEQ ID NO: 69) as a substrate. Each enzyme was incubated at room temperature for 15 minutes in 100 mM pH 4 sodium acetate buffer. After 15 minutes, 50 uL of fluorescent substrate was added ranging in final concentration between 100, 50, 25, 12.5, 6.25, and 0 µM peptide, and maintaining concentrations of 0.05 µM KumaMax™, 0.5 µM KumaWT, 0.5 µM SC Pep, and 0.5 M EP-B2 across all variations in substrate concentration. The plate was read immediately on the spectrophotometer for an hour, using 455 nm wavelength for excitation and reading 485 nm wavelength for emission.

The enzymes were also tested for specificity to different dipeptide motifs using a variety of chromogenic substrates that release p-nitroaniline (pNA) upon hydrolysis: [Suc-APQ-pNA], [Suc-AQP-pNA], [Suc-APE-pNA], and [Suc-APR-pNA]. Again, each enzyme was incubated at room temperature for 15 minutes in 100 mM pH 4 sodium acetate buffer. After 15 minutes, 20 uL of substrate was added to the enzyme incubation so that the final concentrations of substrate ranged between 1000, 500, 250, 125, 62.5, 31.25, 15.625, and 0 µM, and all enzymes being tested ended in a concentration of 0.5 µM. The plate was read immediately on the spectrophotometer for an hour, monitoring absorption by the reactions at 385 nm.

The standard curve for the fluorescent peptide involved mixing substrate and product together at varying concentrations in pH 4 buffer. Substrate concentrations were 100, 50, 25, 12.5, 6.25, and 0 µM, and product concentrations were 20, 5, 1.25, 0.3125, 0.078125, 0 µM.

The standard curve for the absorbent peptide involved product concentrations of 100, 50, 25, 12.5, 6.25, 3.125, 1.5625, 0.78125, 0.390625, 0.1953125, 0.09765625, and 0 µM diluted in pH 4 buffer.

Protease Stability

Enzyme stability was determined in the presence the digestive proteases, pepsin and trypsin. KumaWT, KumaMax™, SC Pep, and EP-B2 were incubated in buffer matching the native pH environment of each digestive protease. pH 3.5 100 mM sodium acetate was used to pre-incubate the enzymes for pepsin digestion assays, and pH 7.5 dialysis buffer (see "Protein Expression and Purification") for the trypsin digestion assays. Each experimental enzyme was incubated at 37° C. for 15 minutes in each buffer, at a concentration of 0.2 mg/mL.

After pre-incubation in the appropriate buffer, 0.1 mg/mL digestive protease was added. The reactions were done in triplicate, and were incubated at 37° C. for 30 minutes. Adding SDS and boiling for 5 minutes ensured digestive protease inactivation. An SDS-PAGE gel allowed quantification of enzyme degradation, using ImageJ.

The rate of protein self-proteolysis was determined at pH 4 and 7.5 in the absence of pepsin or trypsin. Each enzyme, at a concentration of 0.2 mg/mL, was incubated in pH 4 100 mM sodium acetate and pH 7.5 dialysis buffer. At 20, 40, and 60 minutes, timepoints were taken. SDS was added, and the aliquots were boiled for 5 minutes to ensure denaturation of the enzymes and inhibition of further self-proteolysis. Again, an SDS-PAGE gel in conjunction with ImageJ allowed quantification of enzyme self-proteolysis.

LCMS Gliadin Degradation Assay

Enzyme activity on full-length α9-gliadin was measured using high-performance liquid-chromatography mass spectrometry. For each enzyme, 7 µL of pH 4 µlM sodium acetate buffer was added to 28 µL of 5 µM enzyme, and incubated alongside separate tubes of 3 µL gliadin at 37° C. for 15 minutes. Next 27 µL of each enzyme mixture, and 27 µL of dialysis buffer as a control, were added to each tube of gliadin. These were incubated once more at 37° C., and 5 µL samples were taken at 10, 20, 30, 40, and 50 minutes. Each timepoint sample was quenched in 95 µL of 80% acetonitrile with 1% formic acid and approximately 33 µM leupeptin.

The samples were analyzed on the HPLC to compare gliadin degradation by the different proteases over time.

REFERENCES

1. Armstrong, M. J., Hegade, V. S. & Robins, G. Advances in coeliac disease. *Curr Opin Gastroenterol* 28, 104-12 (2012).
2. Sollid, L. M. Coeliac disease: dissecting a complex inflammatory disorder. *Nat Rev Immunol* 2, 647-55 (2002).
3. Wieser, H. Chemistry of gluten proteins. *Food Microbiol* 24, 115-9 (2007).
4. Shan, L. et al. Structural basis for gluten intolerance in celiac sprue. *Science* 297, 2275-9 (2002).
5. Shan, L. Identification and analysis of multivalent proteolytically resistant peptides from gluten: implicatoins for celiac sprue. *Journal of Proteome Research* (2005).
6. Chand, N. & Mihas, A. A. Celiac disease: current concepts in diagnosis and treatment. *J Clin Gastroenterol* 40, 3-14 (2006).
7. Shan, L., Marti, T., Sollid, L. M., Gray, G. M. & Khosla, C. Comparative biochemical analysis of three bacterial prolyl endopeptidases: implications for coeliac sprue. *Biochem J* 383, 311-8 (2004).
8. Siegel, M. et al. Rational design of combination enzyme therapy for celiac sprue. *Chem Biol* 13, 649-58 (2006).
9. Stepniak, D. et al. Highly efficient gluten degradation with a newly identified prolyl endoprotease: implications for celiac disease. *Am J Physiol Gastrointest Liver Physiol* 291, G621-9 (2006).
10. Ehren, J. et al. A food-grade enzyme preparation with modest gluten detoxification properties. *PLoS One* 4, e6313 (2009).
11. Bethune, M. T., Strop, P., Tang, Y., Sollid, L. M. & Khosla, C. Heterologous expression, purification, refolding, and structural-functional characterization of EP-B2, a self-activating barley cysteine endoprotease. *Chem Biol* 13, 637-47 (2006).
12. Okubo, A. et al. Processing, catalytic activity and crystal structures of kumamolisin-As with an engineered active site. *FEBS J* 273, 2563-76 (2006).
13. Gardner, J. D., Ciociola, A. A. & Robinson, M. Measurement of meal-stimulated gastric acid secretion by in vivo gastric autotitration. *J Appl Physiol* 92, 427-34 (2002).
14. Wlodawer, A. et al. Crystallographic and biochemical investigations of kumamolisin-As, a serine-carboxyl peptidase with collagenase activity. *J Biol Chem* 279, 21500-10 (2004).
15. Ehren, J., Govindarajan, S., Moron, B., Minshull, J. & Khosla, C. Protein engineering of improved prolyl endopeptidases for celiac sprue therapy. *Protein Eng Des Sel* 21, 699-707 (2008).
16. Bethune, M. T. & Khosla, C. Oral enzyme therapy for celiac sprue. *Methods Enzymol* 502, 241-71 (2012).
17. Gass, J., Vora, H., Bethune, M. T., Gray, G. M. & Khosla, C. Effect of barley endoprotease EP-B2 on gluten digestion in the intact rat. *J Pharmacol Exp Ther* 318, 1178-86 (2006).
18. Vora, H., McIntire, J., Kumar, P., Deshpande, M. & Khosla, C. A scaleable manufacturing process for pro-EP-B2, a cysteine protease from barley indicated for celiac sprue. *Biotechnol Bioeng* 98, 177-85 (2007).

We claim:

1. A polypeptide comprising an amino acid sequence at least 75% identical to the amino acid sequence according to SEQ ID NO: 1 residues 1-567, wherein
   (a) the polypeptide degrades a PQPQLP (SEQ ID NO:34) peptide at pH 4;
   (b) residue 467 is Ser, residue 267 is Glu, and residue 271 is Asp; and
   (c) the polypeptide comprises one or more residues selected from the group consisting of 119D, 262K, 291D, 293T, and 358G.

2. The polypeptide of claim 1, comprising an amino acid sequence at least 75% identical to the amino acid sequence of SEQ ID NO:1 residues 1-567, wherein the polypeptide comprises two or more residues selected from the group consisting of 119D, 262K, 291D, 293T, and 358G.

3. The polypeptide of claim 2, comprising three or more residues selected from the group consisting of 119D, 262K, 291D, 293T, and 358G.

4. The polypeptide of claim 3, comprising four or more residues selected from the group consisting of 119D, 262K, 291D, 293T, and 358G.

5. The polypeptide of claim 1, wherein the polypeptide comprises each of residues 119D, 262K, 291D, 293T, and 358G.

6. The polypeptide of claim 1, wherein the polypeptide comprises an amino acid sequence at least 90% identical to the amino acid sequence according to SEQ ID NO: 1 residues 1-567.

7. The polypeptide of claim 3 wherein the polypeptide comprises an amino acid sequence at least 90% identical to the amino acid sequence according to SEQ ID NO: 1 residues 1-567.

8. The polypeptide of claim 4 wherein the polypeptide comprises an amino acid sequence at least 90% identical to the amino acid sequence according to SEQ ID NO: 1 residues 1-567.

9. The polypeptide of claim 5, wherein the polypeptide comprises an amino acid sequence at least 90% identical to the amino acid sequence according to SBO ID NO: 1 residues 1-567.

10. The polypeptide of claim 1, wherein the polypeptide comprises an amino acid sequence at least 95% identical to the amino acid sequence according to SEQ ID NO: 1 residues 1-567.

11. The polypeptide of claim 3 wherein the polypeptide comprises an amino acid sequence at least 95% identical to the amino acid sequence according to SEQ ID NO:1 residues 1-567.

12. The polypeptide of claim 4 wherein the polypeptide comprises an amino acid sequence at least 95% identical to the amino acid sequence according to SEQ ID NO: 1 residues 1-567.

13. The polypeptide of claim 5, wherein the polypeptide comprises an amino acid sequence at least 95% identical to the amino acid sequence according to SEQ ID NO:1 residues 1-567.

* * * * *

SEQUENCE LISTING

```
Sequence total quantity: 73
SEQ ID NO: 1            moltype = AA  length = 573
FEATURE                 Location/Qualifiers
REGION                  1..573
                        note = Synthetic
VARIANT                 119
                        note = X can be V or D
VARIANT                 262
                        note = X can be S, K or G
VARIANT                 291
                        note = X can be N or D
VARIANT                 292
                        note = X can be T or S
VARIANT                 293
                        note = X can be D, A, T, or N
VARIANT                 319
                        note = X can be G or S
VARIANT                 354
                        note = X can be S or N
VARIANT                 357
                        note = X can be T or A
VARIANT                 358
                        note = X can be D, N or G
VARIANT                 361
                        note = X can be Q or D
VARIANT                 368
                        note = X can be D, S, or H
source                  1..573
                        mol_type = protein
                        organism = synthetic construct
SEQUENCE: 1
MSDMEKPWKE GEEARAVLQG HARAQAPQAV DKGPVAGDER MAVTVVLRRQ RAGELAAHVE  60
RQAAIAPHAR EHLKREAFAA SHGASLDDFA ELRRFADAHG LALDRANVAA GTAVLSGPXD 120
AINRAFGVEL RHFDHPDGSY RSYLGEVTVP ASIAPMIEAV LGLDTRPVAR PHFRMQRRAE 180
GGFEARSQAA APTAYTPLDV AQAYQFPEGL DGQGQCIAII ELGGGYDEAS LAQYFASLGV 240
PAPQVVSVSV DGASNQPTGD PXGPDGEVEL DIEVAGALAP GAKFAVYFAP XXXAGFLDAI 300
TTAIHDPTLK PSVVSISWXG PEDSWTSAAI AAMNRAFLDA AALGVTVLAA AGDXGSXXGE 360
```

```
XDGLYHVXFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 2            moltype = AA   length = 573
FEATURE                 Location/Qualifiers
REGION                  1..573
                        note = Synthetic
VARIANT                 119
                        note = X can be V or D
VARIANT                 262
                        note = X can be S, K or G
SITE                    291
                        note = MISC_FEATURE - All mutants with more than 10-fold
                         activity have this substitution
VARIANT                 292
                        note = X can be T or S
VARIANT                 293
                        note = X can be D, A, T or N
VARIANT                 319
                        note = X can be G or S
VARIANT                 354
                        note = X can be S or N
VARIANT                 357
                        note = X can be T or A
VARIANT                 358
                        note = X can be D, N or G
VARIANT                 361
                        note = X can be Q or D
VARIANT                 368
                        note = X can be D, S or H
source                  1..573
                        mol_type = protein
                        organism = synthetic construct
SEQUENCE: 2
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPXD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PXGPDGEVEL DIEVAGALAP GAKFAVYFAP DXXAGFLDAI   300
TTAIHDPTLK PSVVSISWXG PEDSWTSAAI AAMNRAFLDA AALGVTVLAA AGDXGSXXGE   360
XDGLYHVXFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 3            moltype = AA   length = 573
FEATURE                 Location/Qualifiers
REGION                  1..573
                        note = Synthetic
VARIANT                 119
                        note = X can be V or D
VARIANT                 262
                        note = X can be S, K, or G
SITE                    291
                        note = MISC_FEATURE - All mutants with more than 20-fold
                         activity increase have this substitution together with 358
                         substitution
VARIANT                 292
                        note = X is T or S
VARIANT                 293
                        note = X is D, A, T or N
VARIANT                 319
                        note = X is G or S
VARIANT                 354
                        note = X is S or N
VARIANT                 357
                        note = X is T or A
VARIANT                 358
                        note = X is N or G (most have G at this position)
VARIANT                 361
                        note = X is Q or D
VARIANT                 368
                        note = X is D, S, or H
source                  1..573
                        mol_type = protein
                        organism = synthetic construct
SEQUENCE: 3
```

```
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPXD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PXGPDGEVEL DIEVAGALAP GAKFAVYFAP DXXAGFLDAI   300
TTAIHDPTLK PSVVSISWXG PEDSWTSAAI AAMNRAFLDA AALGVTVLAA AGDXGSXXGE   360
XDGLYHVXFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573
```

```
SEQ ID NO: 4              moltype = AA  length = 573
FEATURE                   Location/Qualifiers
REGION                    1..573
                          note = Synthetic
VARIANT                   119
                          note = X is V or D
VARIANT                   262
                          note = X is S, K or G
SITE                      291
                          note = MISC_FEATURE - All mutants with more than 50-fold
                           activity increase have this substitution together with
                           319, 358, and 368 substitutions
VARIANT                   292
                          note = X is T or S
VARIANT                   293
                          note = X is D, A, T, or N
VARIANT                   354
                          note = X is S or N
VARIANT                   357
                          note = X is T or A
VARIANT                   361
                          note = X is Q or D
source                    1..573
                          mol_type = protein
                          organism = synthetic construct
SEQUENCE: 4
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPXD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PXGPDGEVEL DIEVAGALAP GAKFAVYFAP DXXAGFLDAI   300
TTAIHDPTLK PSVVSISWSG PEDSWTSAAI AAMNRAFLDA AALGVTVLAA AGDXGSXXGE   360
XDGLYHVHFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573
```

```
SEQ ID NO: 5              moltype = AA  length = 573
FEATURE                   Location/Qualifiers
REGION                    1..573
                          note = Synthetic
source                    1..573
                          mol_type = protein
                          organism = synthetic construct
SEQUENCE: 5
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PSGPDGEVEL DIEVAGALAP GAKFAVYFAP NTDAGFLDAI   300
TTAIHDPTLK PSVVSISWGG PEDSWTSAAI AAMNRAFLDA AALGVTVLAA AGDSGSTNGE   360
QDGLYHVDFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573
```

```
SEQ ID NO: 6              moltype = AA  length = 573
FEATURE                   Location/Qualifiers
REGION                    1..573
                          note = Synthetic
source                    1..573
                          mol_type = protein
                          organism = synthetic construct
SEQUENCE: 6
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
```

```
PAPQVVSVSV DGASNQPTGD PSGPDGEVEL DIEVAGALAP GAKFAVYFAP DTDAGFLDAI    300
TTAIHDPTLK PSVVSISWGG PEDSWTSAAI AAMNRAFLDA AALGVTVLAA AGDSGSTDGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 7             moltype = AA  length = 573
FEATURE                  Location/Qualifiers
REGION                   1..573
                         note = Synthetic
source                   1..573
                         mol_type = protein
                         organism = synthetic construct
SEQUENCE: 7
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTDAGFLDAI    300
TTAIHDPTLK PSVVSISWGG PEDSWTSAAI AAMNRAFLDA AALGVTVLAA AGDSGSTGGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 8             moltype = AA  length = 573
FEATURE                  Location/Qualifiers
REGION                   1..573
                         note = Synthetic
source                   1..573
                         mol_type = protein
                         organism = synthetic construct
SEQUENCE: 8
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTDAGFLDAI    300
TTAIHDPTLK PSVVSISWGG PEDSWTSAAI AAMNRAFLDA AALGVTVLAA AGDSGSADGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 9             moltype = AA  length = 573
FEATURE                  Location/Qualifiers
REGION                   1..573
                         note = Synthetic
source                   1..573
                         mol_type = protein
                         organism = synthetic construct
SEQUENCE: 9
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTAAGFLDAI    300
TTAIHDPTLK PSVVSISWGG PEDSWTSAAI AAMNRAFLDA AALGVTVLAA AGDSGSTDGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 10            moltype = AA  length = 573
FEATURE                  Location/Qualifiers
REGION                   1..573
                         note = Synthetic
source                   1..573
                         mol_type = protein
                         organism = synthetic construct
SEQUENCE: 10
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTDAGFLDAI    300
TTAIHDPTLK PSVVSISWSG PEDSWTSAAI AAMNRAFLDA AALGVTVLAA AGDSGSTDGE    360
QDGLYHVSFP AASPYVLACG GTRLVASGGR IAQETVWNDG PDGGATGGGV SRIFPLPAWQ    420
```

-continued

```
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 11              moltype = AA   length = 573
FEATURE                    Location/Qualifiers
REGION                     1..573
                           note = Synthetic
source                     1..573
                           mol_type = protein
                           organism = synthetic construct
SEQUENCE: 11
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTDAGFLDAI    300
TTAIHDPTLK PSVVSISWGG PEDSWTSAAI AAMNRAFLDA AALGVTVLAA AGDSGSTGGE    360
QDGLYHVHFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 12              moltype = AA   length = 573
FEATURE                    Location/Qualifiers
REGION                     1..573
                           note = Synthetic
source                     1..573
                           mol_type = protein
                           organism = synthetic construct
SEQUENCE: 12
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP DTDAGFLDAI    300
TTAIHDPTLK PSVVSISWGG PEDSWTSAAI AAMNRAFLDA AALGVTVLAA AGDSGSTDGE    360
DDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 13              moltype = AA   length = 573
FEATURE                    Location/Qualifiers
REGION                     1..573
                           note = Synthetic
source                     1..573
                           mol_type = protein
                           organism = synthetic construct
SEQUENCE: 13
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP DTDAGFLDAI    300
TTAIHDPTLK PSVVSISWGG PEDSWTSAAI AAMNRAFLDA AALGVTVLAA AGDSGSTNGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573

SEQ ID NO: 14              moltype = AA   length = 573
FEATURE                    Location/Qualifiers
REGION                     1..573
                           note = Synthetic
source                     1..573
                           mol_type = protein
                           organism = synthetic construct
SEQUENCE: 14
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP DTAAGFLDAI    300
TTAIHDPTLK PSVVSISWGG PEDSWTSAAI AAMNRAFLDA AALGVTVLAA AGDSGSTDGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                573
```

| SEQ ID NO: 15 | moltype = AA   length = 573 |
| --- | --- |
| FEATURE | Location/Qualifiers |
| REGION | 1..573 |
|  | note = Synthetic |
| source | 1..573 |
|  | mol_type = protein |
|  | organism = synthetic construct |

SEQUENCE: 15
```
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTAAGFLDAI  300
TTAIHDPTLK PSVVSISWGG PEDSWTSAAI AAMNRAFLDA AALGVTVLAA AGDSGSTNGE  360
QDGLYHVDFP AASPYVLACG GTRLVASGGR IAQETVWNDG PDGGATGGGV SRIFPLPAWQ  420
EHANVPPSAN PGASSRGRVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573
```

| SEQ ID NO: 16 | moltype = AA   length = 573 |
| --- | --- |
| FEATURE | Location/Qualifiers |
| REGION | 1..573 |
|  | note = Synthetic |
| source | 1..573 |
|  | mol_type = protein |
|  | organism = synthetic construct |

SEQUENCE: 16
```
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP NTDAGFLDAI  300
TTAIHDPTLK PSVVSISWSG PEDSWTSAAI AAMNRAFLDA AALGVTVLAA AGDSGSTGGE  360
QDGLYHVHFP AASPYVLACG GTRLVASGGR IAQETVWNDG PDGGATGGGV SRIFPLPAWQ  420
EHANVPPSAN PGASSRGRVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573
```

| SEQ ID NO: 17 | moltype = AA   length = 573 |
| --- | --- |
| FEATURE | Location/Qualifiers |
| REGION | 1..573 |
|  | note = Synthetic |
| source | 1..573 |
|  | mol_type = protein |
|  | organism = synthetic construct |

SEQUENCE: 17
```
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP NTDAGFLDAI  300
TTAIHDPTLK PSVVSISWGG PEDSWTSAAI AAMNRAFLDA AALGVTVLAA AGDNGSTGGE  360
QDGLYHVHFP AASPYVLACG GTRLVASGGR IAQETVWNDG PDGGATGGGV SRIFPLPAWQ  420
EHANVPPSAN PGASSRGRVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573
```

| SEQ ID NO: 18 | moltype = AA   length = 573 |
| --- | --- |
| FEATURE | Location/Qualifiers |
| REGION | 1..573 |
|  | note = Synthetic |
| source | 1..573 |
|  | mol_type = protein |
|  | organism = synthetic construct |

SEQUENCE: 18
```
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTAGFLDAI   300
TTAIHDPTLK PSVVSISWGG PEDSWTSAAI AAMNRAFLDA AALGVTVLAA AGDSGSTGGE  360
DDGLYHVDFP AASPYVLACG GTRLVASGGR IAQETVWNDG PDGGATGGGV SRIFPLPAWQ  420
EHANVPPSAN PGASSRGRVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573
```

| SEQ ID NO: 19 | moltype = AA   length = 573 |
| --- | --- |
| FEATURE | Location/Qualifiers |

```
REGION                          1..573
                                note = Synthetic
source                          1..573
                                mol_type = protein
                                organism = synthetic construct
SEQUENCE: 19
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PSGPDGEVEL DIEVAGALAP GAKFAVYFAP DTDAGFLDAI   300
TTAIHDPTLK PSVVSISWSG PEDSWTSAAI AAMNRAFLDA AALGVTVLAA AGDSGSTGGE   360
QDGLYHVHFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 20                   moltype = AA  length = 573
FEATURE                         Location/Qualifiers
REGION                          1..573
                                note = Synthetic
source                          1..573
                                mol_type = protein
                                organism = synthetic construct
SEQUENCE: 20
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PSGPDGEVEL DIEVAGALAP GAKFAVYFAP DTAAGFLDAI   300
TTAIHDPTLK PSVVSISWGG PEDSWTSAAI AAMNRAFLDA AALGVTVLAA AGDSGSTNGE   360
DDGLYHVDFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 21                   moltype = AA  length = 573
FEATURE                         Location/Qualifiers
REGION                          1..573
                                note = Synthetic
source                          1..573
                                mol_type = protein
                                organism = synthetic construct
SEQUENCE: 21
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PSGPDGEVEL DIEVAGALAP GAKFAVYFAP NTDAGFLDAI   300
TTAIHDPTLK PSVVSISWSG PEDSWTSAAI AAMNRAFLDA AALGVTVLAA AGDNGSTGGE   360
QDGLYHVHFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 22                   moltype = AA  length = 573
FEATURE                         Location/Qualifiers
REGION                          1..573
                                note = Synthetic
source                          1..573
                                mol_type = protein
                                organism = synthetic construct
SEQUENCE: 22
MSDMEKPWKE GEEARAVLQG HARAQAPQAV DKGPVAGDER MAVTVVLRRQ RAGELAAHVE    60
RQAAIAPHAR EHLKREAFAA SHGASLDDFA ELRRFADAHG LALDRANVAA GTAVLSGPVD   120
AINRAFGVEL RHFDHPDGSY RSYLGEVTVP ASIAPMIEAV LGLDTRPVAR PHFRMQRRAE   180
GGFEARSQAA APTAYTPLDV AQAYQFPEGL DGQGQCIAII ELGGGYDEAS LAQYFASLGV   240
PAPQVVSVSV DGASNQPTGD PSGPDGEVEL DIEVAGALAP GAKFAVYFAP DTAAGFLDAI   300
TTAIHDPTLK PSVVSISWGG PEDSWTSAAI AAMNRAFLDA AALGVTVLAA AGDSGSTGGE   360
DDGLYHVDFP AASPYVLACG GTRLVASGGR IAQETVWNDG PDGGATGGGV SRIFPLPAWQ   420
EHANVPPSAN PGASSGRGVP DLAGNADPAT GYEVVIDGEA TVIGGTSAVA PLFAALVARI   480
NQKLGKAVGY LNPTLYQLPA DVFHDITEGN NDIANRAQIY QAGPGWDPCT GLGSPIGVRL   540
LQALLPSASQ PQPGSTENLY FQSGALEHHH HHH                                573

SEQ ID NO: 23                   moltype = AA  length = 573
FEATURE                         Location/Qualifiers
REGION                          1..573
                                note = Synthetic
source                          1..573
```

```
                        mol_type = protein
                        organism = synthetic construct
SEQUENCE: 23
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTDAGFLDAI  300
TTAIHDPTLK PSVVSISWSG PEDSWTSAAI AAMNRAFLDA AALGVTVLAA AGDSGSTGGE  360
DDGLYHVHFP AASPYVLACG GTRLVASGGR IAQETVWNDG PDGGATGGGV SRIFPLPAWQ  420
EHANVPPSAN PGASSRGVP  DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                               573

SEQ ID NO: 24           moltype = AA  length = 573
FEATURE                 Location/Qualifiers
REGION                  1..573
                        note = Synthetic
source                  1..573
                        mol_type = protein
                        organism = synthetic construct
SEQUENCE: 24
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTDAGFLDAI  300
TTAIHDPTLK PSVVSISWSG PEDSWTSAAI AAMNRAFLDA AALGVTVLAA AGDNGSTGGE  360
QDGLYHVHFP AASPYVLACG GTRLVASGGR IAQETVWNDG PDGGATGGGV SRIFPLPAWQ  420
EHANVPPSAN PGASSRGVP  DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                               573

SEQ ID NO: 25           moltype = AA  length = 573
FEATURE                 Location/Qualifiers
REGION                  1..573
                        note = Synthetic
source                  1..573
                        mol_type = protein
                        organism = synthetic construct
SEQUENCE: 25
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTAAGFLDAI  300
TTAIHDPTLK PSVVSISWSG PEDSWTSAAI AAMNRAFLDA AALGVTVLAA AGDSGSTGGE  360
DDGLYHVHFP AASPYVLACG GTRLVASGGR IAQETVWNDG PDGGATGGGV SRIFPLPAWQ  420
EHANVPPSAN PGASSRGVP  DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                               573

SEQ ID NO: 26           moltype = AA  length = 573
FEATURE                 Location/Qualifiers
REGION                  1..573
                        note = Synthetic
source                  1..573
                        mol_type = protein
                        organism = synthetic construct
SEQUENCE: 26
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTDAGFLDAI  300
TTAIHDPTLK PSVVSISWSG PEDSWTSAAI AAMNRAFLDA AALGVTVLAA AGDNGSTGGE  360
DDGLYHVHFP AASPYVLACG GTRLVASGGR IAQETVWNDG PDGGATGGGV SRIFPLPAWQ  420
EHANVPPSAN PGASSRGVP  DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                               573

SEQ ID NO: 27           moltype = AA  length = 573
FEATURE                 Location/Qualifiers
REGION                  1..573
                        note = Synthetic
source                  1..573
                        mol_type = protein
                        organism = synthetic construct
SEQUENCE: 27
```

```
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTAAGFLDAI  300
TTAIHDPTLK PSVVSISWSG PEDSWTSAAI AAMNRAFLDA AALGVTVLAA AGDNGSTGGE  360
DDGLYHVHFP AASPYVLACG GTRLVASGGR IAQETVWNDG PDDGGATGGGV SRIFPLPAWQ  420
EHANVPPSAN PGASSGRGVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573

SEQ ID NO: 28              moltype = AA  length = 573
FEATURE                    Location/Qualifiers
REGION                     1..573
                           note = Synthetic
source                     1..573
                           mol_type = protein
                           organism = synthetic construct
SEQUENCE: 28
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DSDAGFLDAI  300
TTAIHDPTLK PSVVSISWSG PEDSWTSAAI AAMNRAFLDA AALGVTVLAA AGDSGSTGGE  360
QDGLYHVHFP AASPYVLACG GTRLVASGGR IAQETVWNDG PDDGGATGGGV SRIFPLPAWQ  420
EHANVPPSAN PGASSGRGVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573

SEQ ID NO: 29              moltype = AA  length = 573
FEATURE                    Location/Qualifiers
REGION                     1..573
                           note = Synthetic
source                     1..573
                           mol_type = protein
                           organism = synthetic construct
SEQUENCE: 29
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PSGPDGEVEL DIEVAGALAP GAKFAVYFAP DTTAGFLDAI  300
TTAIHDPTLK PSVVSISWSG PEDSWTSAAI AAMNRAFLDA AALGVTVLAA AGDSGSTGGE  360
QDGLYHVHFP AASPYVLACG GTRLVASGGR IAQETVWNDG PDDGGATGGGV SRIFPLPAWQ  420
EHANVPPSAN PGASSGRGVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573

SEQ ID NO: 30              moltype = AA  length = 573
FEATURE                    Location/Qualifiers
REGION                     1..573
                           note = Synthetic
source                     1..573
                           mol_type = protein
                           organism = synthetic construct
SEQUENCE: 30
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
GGFEARSQAA APTAYTPLDV AQAYQFPEGL DGQGQCIAII ELGGGYDEAS LAQYFASLGV  240
PAPQVVSVSV DGASNQPTGD PGGPDGEVEL DIEVAGALAP GAKFAVYFAP DSDAGFLDAI  300
TTAIHDPTLK PSVVSISWSG PEDSWTSAAI AAMNRAFLDA AALGVTVLAA AGDSGSTGGE  360
QDGLYHVHFP AASPYVLACG GTRLVASGGR IAQETVWNDG PDDGGATGGGV SRIFPLPAWQ  420
EHANVPPSAN PGASSGRGVP DLAGNADPAT GYEVVIDGEA TVIGGTSAVA PLFAALVARI  480
NQKLGKAVGY LNPTLYQLPA DVFHDITEGN NDIANRAQIY QAGPGWDPCT GLGSPIGVRL  540
LQALLPSASQ PQPGSTENLY FQSGALEHHH HHH                              573

SEQ ID NO: 31              moltype = AA  length = 573
FEATURE                    Location/Qualifiers
REGION                     1..573
                           note = Synthetic
source                     1..573
                           mol_type = protein
                           organism = synthetic construct
SEQUENCE: 31
MSDMEKPWKE GEEARAVLQG HARAQAPQAV DKGPVAGDER MAVTVVLRRQ RAGELAAHVE   60
RQAAIAPHAR EHLKREAFAA SHGASLDDFA ELRRFADAHG LALDRANVAA GTAVLSGPVD  120
AINRAFGVEL RHFDHPDGSY RSYLGEVTVP ASIAPMIEAV LGLDTRPVAR PHFRMQRRAE  180
```

```
GGFEARSQAA APTAYTPLDV AQAYQFPEGL DGQGQCIAII ELGGGYDEAS LAQYFASLGV    240
PAPQVVSVSV DGASNQPTGD PKGPDGEVEL DIEVAGALAP GAKFAVYFAP DTNAGFLDAI    300
TTAIHDPTLK PSVVSISWSG PEDSWTSAAI AAMNRAFLDA AALGVTVLAA AGDSGSTGGE    360
QDGLYHVHFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                 573

SEQ ID NO: 32           moltype = AA  length = 573
FEATURE                 Location/Qualifiers
REGION                  1..573
                        note = Synthetic
source                  1..573
                        mol_type = protein
                        organism = synthetic construct
SEQUENCE: 32
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPDD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PKGPDGEVEL DIEVAGALAP GAKFAVYFAP DTTAGFLDAI    300
TTAIHDPTLK PSVVSISWSG PEDSWTSAAI AAMNRAFLDA AALGVTVLAA AGDSGSTGGE    360
QDGLYHVHFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                 573

SEQ ID NO: 33           moltype = AA  length = 573
FEATURE                 Location/Qualifiers
source                  1..573
                        mol_type = protein
                        organism = Homo sapiens
SEQUENCE: 33
MSDMEKPWKE GEEARAVLQG HARAQAPQAV DKGPVAGDER MAVTVVLRRQ RAGELAAHVE     60
RQAAIAPHAR EHLKREAFAA SHGASLDDFA ELRRFADAHG LALDRANVAA GTAVLSGPVD    120
AINRAFGVEL RHFDHPDGSY RSYLGEVTVP ASIAPMIEAV LGLDTRPVAR PHFRMQRRAE    180
GGFEARSQAA APTAYTPLDV AQAYQFPEGL DGQGQCIAII ELGGGYDEAS LAQYFASLGV    240
PAPQVVSVSV DGASNQPTGD PSGPDGEVEL DIEVAGALAP GAKFAVYFAP NTDAGFLDAI    300
TTAIHDPTLK PSVVSISWGG PEDSWTSAAI AAMNRAFLDA AALGVTVLAA AGDSGSTDGE    360
QDGLYHVDFP AASPYVLACG GTRLVASGGR IAQETVWNDG PDGGATGGGV SRIFPLPAWQ    420
EHANVPPSAN PGASSGRGVP DLAGNADPAT GYEVVIDGEA TVIGGTSAVA PLFAALVARI    480
NQKLGKAVGY LNPTLYQLPA DVFHDITEGN NDIANRAQIY QAGPGWDPCT GLGSPIGVRL    540
LQALLPSASQ PQPGSTENLY FQSGALEHHH HHH                                 573

SEQ ID NO: 34           moltype = AA  length = 6
FEATURE                 Location/Qualifiers
REGION                  1..6
                        note = Synthetic
source                  1..6
                        mol_type = protein
                        organism = synthetic construct
SEQUENCE: 34
PQPQLP                                                                 6

SEQ ID NO: 35           moltype = AA  length = 384
FEATURE                 Location/Qualifiers
REGION                  1..384
                        note = Synthetic
VARIANT                 73
                        note = X can be S, K or G
VARIANT                 102
                        note = X can be N or D
VARIANT                 103
                        note = X can be T or S
VARIANT                 104
                        note = X can be T or S
VARIANT                 130
                        note = X can be G or S
VARIANT                 165
                        note = X can be S or N
VARIANT                 168
                        note = X can be T or A
VARIANT                 169
                        note = X can be D, N or G
VARIANT                 172
                        note = X can be Q or D
VARIANT                 179
                        note = X can be D, S, or H
source                  1..384
```

```
                        mol_type = protein
                        organism = synthetic construct
SEQUENCE: 35
AAPTAYTPLD VAQAYQFPEG LDGQGQCIAI IELGGGYDEA SLAQYFASLG VPAPQVVSVS    60
VDGASNQPTG DPXGPDGEVE LDIEVAGALA PGAKFAVYFA PXXXAGFLDA ITTAIHDPTL   120
KPSVVSISWX GPEDSWTSAA IAAMNRAFLD AAALGVTVLA AAGDXGSXXG EXDGLYHVXF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 36           moltype = AA  length = 384
FEATURE                 Location/Qualifiers
REGION                  1..384
                        note = Synthetic
VARIANT                 73
                        note = X can be S, K or G
SITE                    102
                        note = MISC_FEATURE - All mutants with more than 10-fold
                         activity have this substitution
VARIANT                 103
                        note = X can be T or S
VARIANT                 104
                        note = X can be D, A, T or N
VARIANT                 130
                        note = X can be G or S
VARIANT                 165
                        note = X can be S or N
VARIANT                 168
                        note = X can be T or A
VARIANT                 169
                        note = X can be D, N, or G
VARIANT                 172
                        note = X can be Q or D
VARIANT                 179
                        note = X can be D, S, or H
source                  1..384
                        mol_type = protein
                        organism = synthetic construct
SEQUENCE: 36
AAPTAYTPLD VAQAYQFPEG LDGQGQCIAI IELGGGYDEA SLAQYFASLG VPAPQVVSVS    60
VDGASNQPTG DPXGPDGEVE LDIEVAGALA PGAKFAVYFA PDXXAGFLDA ITTAIHDPTL   120
KPSVVSISWX GPEDSWTSAA IAAMNRAFLD AAALGVTVLA AAGDXGSXXG EXDGLYHVXF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 37           moltype = AA  length = 384
FEATURE                 Location/Qualifiers
REGION                  1..384
                        note = Synthetic
VARIANT                 73
                        note = X is S, K, or G
SITE                    102
                        note = MISC_FEATURE - All mutants with more than 20-fold
                         activity increase have this substitution together with 358
                         substitution
VARIANT                 103
                        note = X is T or S
VARIANT                 104
                        note = X is D, A, T or N
VARIANT                 130
                        note = X is G or S
VARIANT                 165
                        note = X is S or N
VARIANT                 168
                        note = X is T or A
VARIANT                 169
                        note = X is N or G (most have G at this position)
VARIANT                 172
                        note = X is Q or D
VARIANT                 179
                        note = X is D, S, or H
source                  1..384
                        mol_type = protein
                        organism = synthetic construct
SEQUENCE: 37
AAPTAYTPLD VAQAYQFPEG LDGQGQCIAI IELGGGYDEA SLAQYFASLG VPAPQVVSVS    60
```

```
VDGASNQPTG DPXGPDGEVE LDIEVAGALA PGAKFAVYFA PDXXAGFLDA ITTAIHDPTL    120
KPSVVSISWX GPEDSWTSAA IAAMNRAFLD AAALGVTVLA AAGDXGSXXG EXDGLYHVXF    180
PAASPYVLAC GGTRLVASGG RIAQETVWND GPDGGATGGG VSRIFPLPAW QEHANVPPSA    240
NPGASSRGRV PDLAGNADPA TGYEVVIDGE ATVIGGTSAV APLFAALVAR INQKLGKAVG    300
YLNPTLYQLP ADVFHDITEG NNDIANRAQI YQAGPGWDPC TGLGSPIGVR LLQALLPSAS    360
QPQPGSTENL YFQSGALEHH HHHH                                          384

SEQ ID NO: 38            moltype = AA  length = 384
FEATURE                  Location/Qualifiers
REGION                   1..384
                         note = Synthetic
VARIANT                  73
                         note = X is S, K, or G
SITE                     102
                         note = MISC_FEATURE - All mutants with more than 50-fold
                          activity increase have this substitution together with
                          319, 358, and 368 substitutions
VARIANT                  103
                         note = X is T or S
VARIANT                  104
                         note = X is D, A, T, or N
VARIANT                  165
                         note = X is S or N
VARIANT                  168
                         note = X is T or A
VARIANT                  172
                         note = X is Q or D
source                   1..384
                         mol_type = protein
                         organism = synthetic construct
SEQUENCE: 38
AAPTAYTPLD VAQAYQFPEG LDGQGQCIAI IELGGGYDEA SLAQYFASLG VPAPQVVSVS     60
VDGASNQPTG DPXGPDGEVE LDIEVAGALA PGAKFAVYFA PDXXAGFLDA ITTAIHDPTL    120
KPSVVSISWS GPEDSWTSAA IAAMNRAFLD AAALGVTVLA AAGDXGSXXG EXDGLYHVHF    180
PAASPYVLAC GGTRLVASGG RIAQETVWND GPDGGATGGG VSRIFPLPAW QEHANVPPSA    240
NPGASSRGRV PDLAGNADPA TGYEVVIDGE ATVIGGTSAV APLFAALVAR INQKLGKAVG    300
YLNPTLYQLP ADVFHDITEG NNDIANRAQI YQAGPGWDPC TGLGSPIGVR LLQALLPSAS    360
QPQPGSTENL YFQSGALEHH HHHH                                          384

SEQ ID NO: 39            moltype = AA  length = 384
FEATURE                  Location/Qualifiers
REGION                   1..384
                         note = Synthetic
source                   1..384
                         mol_type = protein
                         organism = synthetic construct
SEQUENCE: 39
AAPTAYTPLD VAQAYQFPEG LDGQGQCIAI IELGGGYDEA SLAQYFASLG VPAPQVVSVS     60
VDGASNQPTG DPSGPDGEVE LDIEVAGALA PGAKFAVYFA PNTDAGFLDA ITTAIHDPTL    120
KPSVVSISWG GPEDSWTSAA IAAMNRAFLD AAALGVTVLA AAGDSGSTNG EQDGLYHVDF    180
PAASPYVLAC GGTRLVASGG RIAQETVWND GPDGGATGGG VSRIFPLPAW QEHANVPPSA    240
NPGASSRGRV PDLAGNADPA TGYEVVIDGE ATVIGGTSAV APLFAALVAR INQKLGKAVG    300
YLNPTLYQLP ADVFHDITEG NNDIANRAQI YQAGPGWDPC TGLGSPIGVR LLQALLPSAS    360
QPQPGSTENL YFQSGALEHH HHHH                                          384

SEQ ID NO: 40            moltype = AA  length = 384
FEATURE                  Location/Qualifiers
REGION                   1..384
                         note = Synthetic
source                   1..384
                         mol_type = protein
                         organism = synthetic construct
SEQUENCE: 40
AAPTAYTPLD VAQAYQFPEG LDGQGQCIAI IELGGGYDEA SLAQYFASLG VPAPQVVSVS     60
VDGASNQPTG DPSGPDGEVE LDIEVAGALA PGAKFAVYFA PDTDAGFLDA ITTAIHDPTL    120
KPSVVSISWG GPEDSWTSAA IAAMNRAFLD AAALGVTVLA AAGDSGSTDG EQDGLYHVDF    180
PAASPYVLAC GGTRLVASGG RIAQETVWND GPDGGATGGG VSRIFPLPAW QEHANVPPSA    240
NPGASSRGRV PDLAGNADPA TGYEVVIDGE ATVIGGTSAV APLFAALVAR INQKLGKAVG    300
YLNPTLYQLP ADVFHDITEG NNDIANRAQI YQAGPGWDPC TGLGSPIGVR LLQALLPSAS    360
QPQPGSTENL YFQSGALEHH HHHH                                          384

SEQ ID NO: 41            moltype = AA  length = 384
FEATURE                  Location/Qualifiers
REGION                   1..384
                         note = Synthetic
source                   1..384
                         mol_type = protein
                         organism = synthetic construct
SEQUENCE: 41
```

```
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWG GPEDSWTSAA IAAMNRAFLD AAALGVTVLA AAGDSGSTGG EQDGLYHVDF   180
PAASPYVLAC GGTRLVASGG RIAQETVWND GPDGGATGGG VSRIFPLPAW QEHANVPPSA   240
NPGASSRGV  PDLAGNADPA TGYEVVIDGE ATVIGGTSAV APLFAALVAR INQKLGKAVG   300
YLNPTLYQLP ADVFHDITEG NNDIANRAQI YQAGPGWDPA TGLGSPIGVR LLQALLPSAS   360
QPQPGSTENL YFQSGALEHH HHHH                                         384

SEQ ID NO: 42          moltype = AA   length = 384
FEATURE                Location/Qualifiers
REGION                 1..384
                       note = Synthetic
source                 1..384
                       mol_type = protein
                       organism = synthetic construct
SEQUENCE: 42
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWG GPEDSWTSAA IAAMNRAFLD AAALGVTVLA AAGDSGSADG EQDGLYHVDF   180
PAASPYVLAC GGTRLVASGG RIAQETVWND GPDGGATGGG VSRIFPLPAW QEHANVPPSA   240
NPGASSRGV  PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 43          moltype = AA   length = 384
FEATURE                Location/Qualifiers
REGION                 1..384
                       note = Synthetic
source                 1..384
                       mol_type = protein
                       organism = synthetic construct
SEQUENCE: 43
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTAAGFLDA ITTAIHDPTL   120
KPSVVSISWG GPEDSWTSAA IAAMNRAFLD AAALGVTVLA AAGDSGSTDG EQDGLYHVDF   180
PAASPYVLAC GGTRLVASGG RIAQETVWND GPDGGATGGG VSRIFPLPAW QEHANVPPSA   240
NPGASSRGV  PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 44          moltype = AA   length = 384
FEATURE                Location/Qualifiers
REGION                 1..384
                       note = Synthetic
source                 1..384
                       mol_type = protein
                       organism = synthetic construct
SEQUENCE: 44
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWS GPEDSWTSAA IAAMNRAFLD AAALGVTVLA AAGDSGSTDG EQDGLYHVDF   180
PAASPYVLAC GGTRLVASGG RIAQETVWND GPDGGATGGG VSRIFPLPAW QEHANVPPSA   240
NPGASSRGV  PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 45          moltype = AA   length = 384
FEATURE                Location/Qualifiers
REGION                 1..384
                       note = Synthetic
source                 1..384
                       mol_type = protein
                       organism = synthetic construct
SEQUENCE: 45
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWG GPEDSWTSAA IAAMNRAFLD AAALGVTVLA AAGDSGSTGG EQDGLYHVHF   180
PAASPYVLAC GGTRLVASGG RIAQETVWND GPDGGATGGG VSRIFPLPAW QEHANVPPSA   240
NPGASSRGV  PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 46          moltype = AA   length = 384
FEATURE                Location/Qualifiers
REGION                 1..384
                       note = Synthetic
source                 1..384
                       mol_type = protein
                       organism = synthetic construct
```

```
SEQUENCE: 46
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTDAGFLDA ITTAIHDPTL     120
KPSVVSISWG GPEDSWTSAA IAAMNRAFLD AAALGVTVLA AAGDSGSTDG EDDGLYHVDF     180
PAASPYVLAC GGTRLVASGG RIAQETVWND GPDGGATGGG VSRIFPLPAW QEHANVPPSA     240
NPGASSGRGV PDLAGNADPA TGYEVVIDGE ATVIGGTSAV APLFAALVAR INQKLGKAVG     300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 47          moltype = AA  length = 384
FEATURE                Location/Qualifiers
REGION                 1..384
                       note = Synthetic
source                 1..384
                       mol_type = protein
                       organism = synthetic construct
SEQUENCE: 47
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTDAGFLDA ITTAIHDPTL     120
KPSVVSISWG GPEDSWTSAA IAAMNRAFLD AAALGVTVLA AAGDSGSTNG EQDGLYHVDF     180
PAASPYVLAC GGTRLVASGG RIAQETVWND GPDGGATGGG VSRIFPLPAW QEHANVPPSA     240
NPGASSGRGV PDLAGNADPA TGYEVVIDGE ATVIGGTSAV APLFAALVAR INQKLGKAVG     300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 48          moltype = AA  length = 384
FEATURE                Location/Qualifiers
REGION                 1..384
                       note = Synthetic
source                 1..384
                       mol_type = protein
                       organism = synthetic construct
SEQUENCE: 48
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTAAGFLDA ITTAIHDPTL     120
KPSVVSISWG GPEDSWTSAA IAAMNRAFLD AAALGVTVLA AAGDSGSTDG EQDGLYHVDF     180
PAASPYVLAC GGTRLVASGG RIAQETVWND GPDGGATGGG VSRIFPLPAW QEHANVPPSA     240
NPGASSGRGV PDLAGNADPA TGYEVVIDGE ATVIGGTSAV APLFAALVAR INQKLGKAVG     300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 49          moltype = AA  length = 384
FEATURE                Location/Qualifiers
REGION                 1..384
                       note = Synthetic
source                 1..384
                       mol_type = protein
                       organism = synthetic construct
SEQUENCE: 49
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTAAGFLDA ITTAIHDPTL     120
KPSVVSISWG GPEDSWTSAA IAAMNRAFLD AAALGVTVLA AAGDSGSTNG EQDGLYHVDF     180
PAASPYVLAC GGTRLVASGG RIAQETVWND GPDGGATGGG VSRIFPLPAW QEHANVPPSA     240
NPGASSGRGV PDLAGNADPA TGYEVVIDGE ATVIGGTSAV APLFAALVAR INQKLGKAVG     300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 50          moltype = AA  length = 384
FEATURE                Location/Qualifiers
REGION                 1..384
                       note = Synthetic
source                 1..384
                       mol_type = protein
                       organism = synthetic construct
SEQUENCE: 50
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PNTDAGFLDA ITTAIHDPTL     120
KPSVVSISWS GPEDSWTSAA IAAMNRAFLD AAALGVTVLA AAGDSGSTGG EQDGLYHVHF     180
PAASPYVLAC GGTRLVASGG RIAQETVWND GPDGGATGGG VSRIFPLPAW QEHANVPPSA     240
NPGASSGRGV PDLAGNADPA TGYEVVIDGE ATVIGGTSAV APLFAALVAR INQKLGKAVG     300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 51          moltype = AA  length = 384
FEATURE                Location/Qualifiers
REGION                 1..384
                       note = Synthetic
source                 1..384
                       mol_type = protein
```

```
                         organism = synthetic construct
SEQUENCE: 51
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWG GPEDSWTSAA IAAMNRAFLD AAALGVTVLA AAGDNGSTGG EQDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 52           moltype = AA  length = 384
FEATURE                 Location/Qualifiers
REGION                  1..384
                        note = Synthetic
source                  1..384
                        mol_type = protein
                        organism = synthetic construct
SEQUENCE: 52
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTDAGFLDA ITTAIHDPTL   120
KPSVVSISWG GPEDSWTSAA IAAMNRAFLD AAALGVTVLA AAGDSGSTGG EDDGLYHVDF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 53           moltype = AA  length = 384
FEATURE                 Location/Qualifiers
REGION                  1..384
                        note = Synthetic
source                  1..384
                        mol_type = protein
                        organism = synthetic construct
SEQUENCE: 53
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTDAGFLDA ITTAIHDPTL   120
KPSVVSISWS GPEDSWTSAA IAAMNRAFLD AAALGVTVLA AAGDSGSTGG EQDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 54           moltype = AA  length = 384
FEATURE                 Location/Qualifiers
REGION                  1..384
                        note = Synthetic
source                  1..384
                        mol_type = protein
                        organism = synthetic construct
SEQUENCE: 54
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTAAGFLDA ITTAIHDPTL   120
KPSVVSISWG GPEDSWTSAA IAAMNRAFLD AAALGVTVLA AAGDSGSTNG EDDGLYHVDF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 55           moltype = AA  length = 384
FEATURE                 Location/Qualifiers
REGION                  1..384
                        note = Synthetic
source                  1..384
                        mol_type = protein
                        organism = synthetic construct
SEQUENCE: 55
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWS GPEDSWTSAA IAAMNRAFLD AAALGVTVLA AAGDNGSTGG EQDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                          384

SEQ ID NO: 56           moltype = AA  length = 384
FEATURE                 Location/Qualifiers
REGION                  1..384
                        note = Synthetic
source                  1..384
```

```
                         mol_type = protein
                         organism = synthetic construct
SEQUENCE: 56
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTAAGFLDA ITTAIHDPTL   120
KPSVVSISWG GPEDSWTSAA IAAMNRAFLD AAALGVTVLA AAGDSGSTGG EDDGLYHVDF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 57            moltype = AA  length = 384
FEATURE                  Location/Qualifiers
REGION                   1..384
                         note = Synthetic
source                   1..384
                         mol_type = protein
                         organism = synthetic construct
SEQUENCE: 57
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTDAGFLDA ITTAIHDPTL   120
KPSVVSISWS GPEDSWTSAA IAAMNRAFLD AAALGVTVLA AAGDSGSTGG EDDGLYHVDF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 58            moltype = AA  length = 384
FEATURE                  Location/Qualifiers
REGION                   1..384
                         note = Synthetic
source                   1..384
                         mol_type = protein
                         organism = synthetic construct
SEQUENCE: 58
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTDAGFLDA ITTAIHDPTL   120
KPSVVSISWS GPEDSWTSAA IAAMNRAFLD AAALGVTVLA AAGDNGSTGG EQDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 59            moltype = AA  length = 384
FEATURE                  Location/Qualifiers
REGION                   1..384
                         note = Synthetic
source                   1..384
                         mol_type = protein
                         organism = synthetic construct
SEQUENCE: 59
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTAAGFLDA ITTAIHDPTL   120
KPSVVSISWS GPEDSWTSAA IAAMNRAFLD AAALGVTVLA AAGDSGSTGG EDDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 60            moltype = AA  length = 384
FEATURE                  Location/Qualifiers
REGION                   1..384
                         note = Synthetic
source                   1..384
                         mol_type = protein
                         organism = synthetic construct
SEQUENCE: 60
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PDTAAGFLDA ITTAIHDPTL   120
KPSVVSISWS GPEDSWTSAA IAAMNRAFLD AAALGVTVLA AAGDNGSTGG EDDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 61            moltype = AA  length = 384
FEATURE                  Location/Qualifiers
REGION                   1..384
                         note = Synthetic
```

```
source                  1..384
                        mol_type = protein
                        organism = synthetic construct
SEQUENCE: 61
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTAAGFLDA ITTAIHDPTL     120
KPSVVSISWS GPEDSWTSAA IAAMNRAFLD AAALGVTVLA AAGDNGSTGG EDDGLYHVHF     180
PAASPYVLAC GGTRLVASGG RIAQETVWND GPDGGATGGG VSRIFPLPAW QEHANVPPSA     240
NPGASSRGV PDLAGNADPA TGYEVVIDGE ATVIGGTSAV APLFAALVAR INQKLGKAVG      300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 62           moltype = AA   length = 384
FEATURE                 Location/Qualifiers
REGION                  1..384
                        note = Synthetic
source                  1..384
                        mol_type = protein
                        organism = synthetic construct
SEQUENCE: 62
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDSDAGFLDA ITTAIHDPTL     120
KPSVVSISWS GPEDSWTSAA IAAMNRAFLD AAALGVTVLA AAGDSGSTGG EQDGLYHVHF     180
PAASPYVLAC GGTRLVASGG RIAQETVWND GPDGGATGGG VSRIFPLPAW QEHANVPPSA     240
NPGASSRGV PDLAGNADPA TGYEVVIDGE ATVIGGTSAV APLFAALVAR INQKLGKAVG      300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 63           moltype = AA   length = 384
FEATURE                 Location/Qualifiers
REGION                  1..384
                        note = Synthetic
source                  1..384
                        mol_type = protein
                        organism = synthetic construct
SEQUENCE: 63
AAPTAYTPLD VAQAYQFPEG LDGQGQCIAI IELGGGYDEA SLAQYFASLG VPAPQVVSVS      60
VDGASNQPTG DPSGPDGEVE LDIEVAGALA PGAKFAVYFA PDTTAGFLDA ITTAIHDPTL     120
KPSVVSISWS GPEDSWTSAA IAAMNRAFLD AAALGVTVLA AAGDSGSTGG EQDGLYHVHF     180
PAASPYVLAC GGTRLVASGG RIAQETVWND GPDGGATGGG VSRIFPLPAW QEHANVPPSA     240
NPGASSRGV PDLAGNADPA TGYEVVIDGE ATVIGGTSAV APLFAALVAR INQKLGKAVG      300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 64           moltype = AA   length = 384
FEATURE                 Location/Qualifiers
REGION                  1..384
                        note = Synthetic
source                  1..384
                        mol_type = protein
                        organism = synthetic construct
SEQUENCE: 64
AAPTAYTPLD VAQAYQFPEG LDGQGQCIAI IELGGGYDEA SLAQYFASLG VPAPQVVSVS      60
VDGASNQPTG DPGGPDGEVE LDIEVAGALA PGAKFAVYFA PDSDAGFLDA ITTAIHDPTL     120
KPSVVSISWS GPEDSWTSAA IAAMNRAFLD AAALGVTVLA AAGDSGSTGG EQDGLYHVHF     180
PAASPYVLAC GGTRLVASGG RIAQETVWND GPDGGATGGG VSRIFPLPAW QEHANVPPSA     240
NPGASSRGV PDLAGNADPA TGYEVVIDGE ATVIGGTSAV APLFAALVAR INQKLGKAVG      300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 65           moltype = AA   length = 384
FEATURE                 Location/Qualifiers
REGION                  1..384
                        note = Synthetic
source                  1..384
                        mol_type = protein
                        organism = synthetic construct
SEQUENCE: 65
AAPTAYTPLD VAQAYQFPEG LDGQGQCIAI IELGGGYDEA SLAQYFASLG VPAPQVVSVS      60
VDGASNQPTG DPKGPDGEVE LDIEVAGALA PGAKFAVYFA PDTNAGFLDA ITTAIHDPTL     120
KPSVVSISWS GPEDSWTSAA IAAMNRAFLD AAALGVTVLA AAGDSGSTGG EQDGLYHVHF     180
PAASPYVLAC GGTRLVASGG RIAQETVWND GPDGGATGGG VSRIFPLPAW QEHANVPPSA     240
NPGASSRGV PDLAGNADPA TGYEVVIDGE ATVIGGTSAV APLFAALVAR INQKLGKAVG      300
YLNPTLYQLP ADVFHDITEG NNDIANRAQI YQAGPGWDPC TGLGSPIGVR LLQALLPSAS     360
QPQPGSTENL YFQSGALEHH HHHH                                            384

SEQ ID NO: 66           moltype = AA   length = 384
FEATURE                 Location/Qualifiers
REGION                  1..384
```

```
                        note = Synthetic
source                  1..384
                        mol_type = protein
                        organism = synthetic construct
SEQUENCE: 66
AAPTAYTPLD VAQAYQFPEG LDGQGQCIAI IELGGGYDEA SLAQYFASLG VPAPQVVSVS    60
VDGASNQPTG DPKGPDGEVE LDIEVAGALA PGAKFAVYFA PDTTAGFLDA ITTAIHDPTL   120
KPSVVSISWS GPEDSWTSAA IAAMNRAFLD AAALGVTVLA AAGDSGSTGG EQDGLYHVHF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 67           moltype = AA  length = 384
FEATURE                 Location/Qualifiers
source                  1..384
                        mol_type = protein
                        organism = Homo sapiens
SEQUENCE: 67
AAPTAYTPLD VAQAYQFPEG LDGQGQCIAI IELGGGYDEA SLAQYFASLG VPAPQVVSVS    60
VDGASNQPTG DPSGPDGEVE LDIEVAGALA PGAKFAVYFA PNTDAGFLDA ITTAIHDPTL   120
KPSVVSISWG GPEDSWTSAA IAAMNRAFLD AAALGVTVLA AAGDSGSTDG EQDGLYHVDF   180
PAASPYVLAC GGTRLVASGG RIAQETVWND GPDGGATGGG VSRIFPLPAW QEHANVPPSA   240
NPGASSGRGV PDLAGNADPA TGYEVVIDGE ATVIGGTSAV APLFAALVAR INQKLGKAVG   300
YLNPTLYQLP ADVFHDITEG NNDIANRAQI YQAGPGWDPC TGLGSPIGVR LLQALLPSAS   360
QPQPGSTENL YFQSGALEHH HHHH                                         384

SEQ ID NO: 68           moltype = AA  length = 4
FEATURE                 Location/Qualifiers
REGION                  1..4
                        note = Synthetic
source                  1..4
                        mol_type = protein
                        organism = synthetic construct
SEQUENCE: 68
PQLP                                                                 4

SEQ ID NO: 69           moltype = AA  length = 6
FEATURE                 Location/Qualifiers
REGION                  1..6
                        note = Synthetic
VARIANT                 1
                        note = N-terminal QXL520
VARIANT                 6
                        note = C-terminal K(5-FAM)
source                  1..6
                        mol_type = protein
                        organism = synthetic construct
SEQUENCE: 69
PQPQLP                                                               6

SEQ ID NO: 70           moltype = AA  length = 12
FEATURE                 Location/Qualifiers
REGION                  1..12
                        note = Synthetic
source                  1..12
                        mol_type = protein
                        organism = synthetic construct
SEQUENCE: 70
QLQPFPQPQL PY                                                       12

SEQ ID NO: 71           moltype = AA  length = 290
FEATURE                 Location/Qualifiers
source                  1..290
                        mol_type = protein
                        organism = Homo sapiens
SEQUENCE: 71
MVRVPVPQLQ PQNPSQQQPQ EQVPLVQQQQ FPGQQQPFPP QQPYPQPQPF PSQQFYLQLQ    60
PFPQPQLPYP QPQLPYPQPQ LPYPQPQPFR PQQPYPQSQP QYSQPQQPIS QQQQQQQQQQ   120
QQKQQQQQQQ QILQQILQQQ LIPCRDVVLQ QHSIAYGSSQ VLQQSTYGLV QQLCCQQLWQ   180
IPEQSRCQAI HNVVHAIILH QQQQQQQQQQ QQPLSQVSFQ QPQQQYPSGQ GSFQPSQQNP   240
QAQGSVQPQQ LPQFEEIRNL ALETLPAMCN VYIPPYCTIA PVGIFGTNYR              290

SEQ ID NO: 72           moltype = AA  length = 33
FEATURE                 Location/Qualifiers
REGION                  1..33
                        note = Synthetic
source                  1..33
                        mol_type = protein
```

```
                        organism = synthetic construct
SEQUENCE: 72
LQLQPFPQPQ LPYPQPQLPY PQPQLPYPQP QPF                              33

SEQ ID NO: 73           moltype = AA   length = 26
FEATURE                 Location/Qualifiers
REGION                  1..26
                        note = Synthetic
source                  1..26
                        mol_type = protein
                        organism = synthetic construct
SEQUENCE: 73
FLQPQQPFPP QQPQQPYPQQ PQQPFP                                      26
```